US011516876B2

(12) United States Patent
Hosseini et al.

(10) Patent No.: US 11,516,876 B2
(45) Date of Patent: Nov. 29, 2022

(54) DISCONTINUOUS RECEPTION CONFIGURATION FOR SIDELINK

(71) Applicant: QUALCOMM Incorporated, San Diego, CA (US)

(72) Inventors: Seyedkianoush Hosseini, San Diego, CA (US); Peter Pui Lok Ang, San Diego, CA (US); Gabi Sarkis, San Diego, CA (US); Gokul Sridharan, Sunnyvale, CA (US); Tingfang Ji, San Diego, CA (US); Wooseok Nam, San Diego, CA (US); Hong Cheng, Basking Ridge, NJ (US); Junyi Li, Chester, NJ (US); Zhibin Wu, Los Altos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/996,868

(22) Filed: Aug. 18, 2020

(65) Prior Publication Data

US 2021/0059005 A1   Feb. 25, 2021

Related U.S. Application Data

(60) Provisional application No. 62/888,982, filed on Aug. 19, 2019.

(51) Int. Cl.
*H04W 76/28* (2018.01)
*H04W 76/11* (2018.01)
(Continued)

(52) U.S. Cl.
CPC ............ *H04W 76/28* (2018.02); *H04W 4/40* (2018.02); *H04W 24/08* (2013.01);
(Continued)

(58) Field of Classification Search
CPC ....... H04W 76/29; H04W 76/11; H04W 4/40; H04W 24/08; H04W 52/0229; H04W 80/02; H04W 92/18
(Continued)

(56) References Cited

U.S. PATENT DOCUMENTS

2016/0295624 A1\* 10/2016 Novlan ................... H04L 67/12
2016/0381666 A1\* 12/2016 Kim .................. H04W 72/0446
370/329
(Continued)

FOREIGN PATENT DOCUMENTS

EP             2983386 A1     2/2016
WO     WO-2017196611 A1     11/2017
(Continued)

OTHER PUBLICATIONS

International Search Report and Written Opinion—PCT/US2020/047055—ISA/EPO—dated Dec. 21, 2020.

*Primary Examiner* — Mong-Thuy T Tran
(74) *Attorney, Agent, or Firm* — Danai Nelisile Mhembere; Holland & Hart LLP

(57) ABSTRACT

Methods, systems, and devices for wireless communications are described. A user equipment (UE) may determine one or more sidelink discontinuous reception (DRX) parameters for a configured sidelink DRX cycle. The sidelink DRX parameters may be selected by the UE or may be indicated by a base station. In some cases, the UE may transmit an indication of the sidelink DRX parameters to another UE (e.g., via a sidelink communication link). A UE may discontinuously monitor for transmissions over the sidelink communication link in accordance with the sidelink DRX parameters.

29 Claims, 17 Drawing Sheets

(51) Int. Cl.
  *H04W 80/02*  (2009.01)
  *H04W 52/02*  (2009.01)
  *H04W 4/40*   (2018.01)
  *H04W 24/08*  (2009.01)
  *H04W 92/18*  (2009.01)

(52) U.S. Cl.
  CPC ........ H04W 52/0229 (2013.01); H04W 76/11 (2018.02); H04W 80/02 (2013.01); *H04W 92/18* (2013.01)

(58) Field of Classification Search
  USPC .......................................................... 370/329
  See application file for complete search history.

(56) References Cited

U.S. PATENT DOCUMENTS

| | | | |
|---|---|---|---|
| 2017/0078964 A1* | 3/2017 | Siomina | H04W 76/28 |
| 2017/0245319 A1 | 8/2017 | Yasukawa et al. | |
| 2019/0053305 A1* | 2/2019 | Saiwai | H04W 76/11 |
| 2020/0120745 A1* | 4/2020 | Yang | H04W 76/28 |
| 2020/0245395 A1* | 7/2020 | Zhang | H04L 5/0053 |
| 2020/0344722 A1* | 10/2020 | He | H04W 72/0446 |
| 2020/0404663 A1* | 12/2020 | Zhang | H04W 72/0466 |
| 2021/0037468 A1* | 2/2021 | Huang | H04W 4/46 |
| 2021/0297842 A1* | 9/2021 | Shrivastava | H04W 28/0284 |

FOREIGN PATENT DOCUMENTS

| | | | | |
|---|---|---|---|---|
| WO | WO-2018064477 A1 | | 4/2018 | |
| WO | WO-2020118657 A1 * | | 6/2020 | ........... H04L 1/1812 |

* cited by examiner

DISCONTINUOUS RECEPTION CONFIGURATION FOR SIDELINK

CROSS REFERENCE

The present application for patent claims the benefit of U.S. Provisional Patent Application No. 62/888,982 by Hosseini et al., entitled "DISCONTINUOUS RECEPTION CONFIGURATION FOR SIDELINK," filed Aug. 19, 2019, assigned to the assignee hereof, and expressly incorporated by reference in its entirety.

INTRODUCTION

The following relates to wireless communications and more specifically to techniques enabling power saving at a device.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communication at a first UE is described. The method may include determining one or more sidelink discontinuous reception (DRX) parameters for sidelink communication with a second UE and transmitting to the second UE, an indication of the one or more sidelink DRX parameters. In some examples, the indication is transmitted over a sidelink communication link with the second UE.

An apparatus for wireless communication is described. The apparatus may include a processor and memory coupled to the processor. The processor and memory may be configured to cause the apparatus to determine (e.g., at a first UE) one or more sidelink DRX parameters for sidelink communication with a second UE. In some examples, the processor and memory may be configured to transmit, to the second UE, an indication of the one or more sidelink DRX parameters, where the indication is transmitted over a sidelink communication link with the second UE.

Another apparatus for wireless communication is described. The apparatus may include means for determining (e.g., at a first UE) one or more sidelink DRX parameters for sidelink communication with a second UE. The apparatus may include means for transmitting, to the second UE, an indication of the one or more sidelink DRX parameters, where the indication is transmitted over a sidelink communication link with the second UE.

A non-transitory computer-readable medium storing code for wireless communication is described. The code may include instructions executable by a processor to determine (e.g., at a first UE) one or more sidelink DRX parameters for sidelink communication with a second UE. The code may include instructions executable by the processor to transmit to the second UE, an indication of the one or more sidelink DRX parameters, where the indication is transmitted over a sidelink communication link with the second UE.

In some examples of the method, apparatuses, and non-transitory computer-readable medium described herein, determining the one or more sidelink DRX parameters may include operations, features, means, or instructions for receiving, from a base station, a message indicating the one or more sidelink DRX parameters for the second UE.

In some examples of the method, apparatuses, and non-transitory computer-readable medium described herein, determining the one or more sidelink DRX parameters may include operations, features, means, or instructions for selecting the one or more sidelink DRX parameters from a set of sidelink DRX parameters for the second UE.

In some examples of the method, apparatuses, and non-transitory computer-readable medium described herein, transmitting the indication of the one or more sidelink DRX parameters may include operations, features, means, or instructions for transmitting an indication of a destination identity that corresponds to an identity of the second UE, where the one or more sidelink DRX parameters may be identified based on the destination identity.

In some examples of the method, apparatuses, and non-transitory computer-readable medium described herein, transmitting the indication of the one or more sidelink DRX parameters may include operations, features, means, or instructions for transmitting the indication to the second UE via sidelink control information (SCI), or a medium access control (MAC) control element, or a combination thereof.

Some examples of the method, apparatuses, and non-transitory computer-readable medium described herein may further include operations, features, means, or instructions for transmitting the DCI to the second UE on a physical sidelink control channel (PSCCH).

Some examples of the method, apparatuses, and non-transitory computer-readable medium described herein may further include operations, features, means, or instructions for transmitting a message to the second UE in accordance with the one or more sidelink DRX parameters.

Some examples of the method, apparatuses, and non-transitory computer-readable medium described herein may further include operations, features, means, or instructions for receiving, from a base station, an indication of one or more DRX parameters for communicating with the base station, where the one or more DRX parameters may be different from the one or more sidelink DRX parameters, and discontinuously monitoring for a transmission from the base station in accordance with the one or more DRX parameters.

In some examples of the method, apparatuses, and non-transitory computer-readable medium described herein, discontinuously monitoring for the transmission from the base station may include operations, features, means, or instructions for powering down a first power amplifier for communicating with the base station in accordance with the one or more DRX parameters, the method further including, and powering down a second power amplifier for the sidelink communication link in accordance with the one or more sidelink DRX parameters.

In some examples of the method, apparatuses, and non-transitory computer-readable medium described herein, respective configurations of the one or more DRX parameters and the one or more sidelink DRX parameters may be based on a first carrier for communicating with the base station and a second carrier for the sidelink communication link, a first frequency range for communicating with the base station and a second frequency range for the sidelink communication link, one or more bands of a primary land mobile network for the sidelink communication link, or a combination thereof.

Some examples of the method, apparatuses, and non-transitory computer-readable medium described herein may further include operations, features, means, or instructions for receiving, from a base station, an indication of one or more DRX parameters for communicating with the base station, where the one or more DRX parameters may be the same as the one or more sidelink DRX parameters, and discontinuously monitoring for a transmission from the base station in accordance with the one or more DRX parameters.

In some examples of the method, apparatuses, and non-transitory computer-readable medium described herein, the one or more sidelink DRX parameters includes an ON duration, an offset duration, an inactivity timer, one or more cycle durations, a cycle timer, or any combination thereof.

In some examples of the method, apparatuses, and non-transitory computer-readable medium described herein, the first UE may be within a coverage area of a base station. In some examples of the method, apparatuses, and non-transitory computer-readable medium described herein, the first UE and the second UE may be outside a coverage area of a base station.

A method of wireless communication at a first UE is described. The method may include determining one or more sidelink DRX parameters for sidelink communication with a second UE. The method may further include discontinuously monitoring (e.g., at the first UE) a sidelink communication link for a transmission from the second UE in accordance with the one or more sidelink DRX parameters.

An apparatus for wireless communication is described. The apparatus may include a processor and memory coupled to the processor. The processor and memory may be configured to determine (e.g., at a first UE) one or more sidelink DRX parameters for sidelink communication with a second UE. In some examples, the processor and memory may be configured to discontinuously monitor a sidelink communication link for a transmission from the second UE in accordance with the one or more sidelink DRX parameters.

Another apparatus for wireless communication is described. The apparatus may include means for determining (e.g., at a first UE) one or more sidelink DRX parameters for sidelink communication with a second UE. In some examples, the apparatus may include means for discontinuously monitoring a sidelink communication link for a transmission from the second UE in accordance with the one or more sidelink DRX parameters.

A non-transitory computer-readable medium storing code for wireless communication is described. The code may include instructions executable by a processor to determine (e.g., at a first UE) one or more sidelink DRX parameters for sidelink communication with a second UE. In some examples, the code may include instructions executable by a processor to discontinuously monitor a sidelink communication link for a transmission from the second UE in accordance with the one or more sidelink DRX parameters.

Some examples of the method, apparatuses, and non-transitory computer-readable medium described herein may further include operations, features, means, or instructions for receiving, from the second UE, an indication of the one or more sidelink DRX parameters, the indication received over the sidelink communication link, where the one or more sidelink DRX parameters may be determined based on the received indication.

Some examples of the method, apparatuses, and non-transitory computer-readable medium described herein may further include operations, features, means, or instructions for receiving the indication of the one or more sidelink DRX parameters from the second UE via SCI, or a MAC control element, or a combination thereof.

Some examples of the method, apparatuses, and non-transitory computer-readable medium described herein may further include operations, features, means, or instructions for receiving the DCI from the second UE on a PSCCH.

Some examples of the method, apparatuses, and non-transitory computer-readable medium described herein may further include operations, features, means, or instructions for receiving, from a base station, a message indicating the one or more sidelink DRX parameters for the second UE, where the one or more sidelink DRX parameters may be determined based on the received indication.

Some examples of the method, apparatuses, and non-transitory computer-readable medium described herein may further include operations, features, means, or instructions for identifying the one or more sidelink DRX parameters based on a destination identity corresponding to an identity of the first UE, where discontinuously monitoring the sidelink communication link may be based on identifying the one or more sidelink DRX parameters.

In some examples of the method, apparatuses, and non-transitory computer-readable medium described herein, the one or more sidelink DRX parameters includes an ON duration, an offset duration, an inactivity timer, one or more cycle durations, a cycle timer, or any combination thereof. In some examples of the method, apparatuses, and non-transitory computer-readable medium described herein, the first UE may be outside a coverage area of a base station.

A method of wireless communication at a base station is described. The method may include configuring one or more sidelink DRX parameters for sidelink communication between a first UE and a second UE over a sidelink communication link. The method may further include transmitting, to the first UE, a message indicating the one or more sidelink DRX parameters.

An apparatus for wireless communication at a base station is described. The apparatus may include a processor and memory coupled to the processor. The processor and memory may configure one or more sidelink DRX parameters for sidelink communication between a first UE and a second UE over a sidelink communication link. The processor and memory may be configured to transmit, to the first UE, a message indicating the one or more sidelink DRX parameters.

Another apparatus for wireless communication at a base station is described. The apparatus may include means for configuring one or more sidelink DRX parameters for sidelink communication between a first UE and a second UE over a sidelink communication link. In some examples, the apparatus may include means for transmitting, to the first UE, a message indicating the one or more sidelink DRX parameters.

A non-transitory computer-readable medium storing code for wireless communication at a base station is described. The code may include instructions executable by a processor to configure one or more sidelink DRX parameters for sidelink communication between a first UE and a second UE over a sidelink communication link. In some examples, the code may include instructions executable by a processor to transmit, to the first UE, a message indicating the one or more sidelink DRX parameters.

In some examples of the method, apparatuses, and non-transitory computer-readable medium described herein, transmitting the message indicating the one or more sidelink DRX parameters may include operations, features, means, or instructions for determining an identity of the second UE, and transmitting, as part of the message, an indication of a destination identity that corresponds to the identity of the second UE, where the one or more sidelink DRX parameters may be identified based on the destination identity.

Some examples of the method, apparatuses, and non-transitory computer-readable medium described herein may further include operations, features, means, or instructions for transmitting, to the second UE, a second message indicating the one or more sidelink DRX parameters.

Some examples of the method, apparatuses, and non-transitory computer-readable medium described herein may further include operations, features, means, or instructions for configuring one or more DRX parameters for communicating with the first UE, where the one or more DRX parameters may be different from the one or more sidelink DRX parameters, and transmitting, to the first UE, an indication of the one or more DRX parameters.

In some examples of the method, apparatuses, and non-transitory computer-readable medium described herein, respective configurations of the one or more DRX parameters and the one or more sidelink DRX parameters may be based on a first carrier for communicating with the base station and a second carrier for the sidelink communication link, a first frequency range for communicating with the base station and a second frequency range for the sidelink communication link, one or more bands of a primary land mobile network for the sidelink communication link, or a combination thereof.

Some examples of the method, apparatuses, and non-transitory computer-readable medium described herein may further include operations, features, means, or instructions for configuring one or more DRX parameters for communicating with the first UE, where the one or more DRX parameters may be the same as the one or more sidelink DRX parameters, and transmitting, to the first UE, an indication of the one or more DRX parameters.

In some examples of the method, apparatuses, and non-transitory computer-readable medium described herein, the one or more sidelink DRX parameters includes an ON duration, an offset duration, an inactivity timer, one or more cycle durations, a cycle timer, or any combination thereof.

In some examples of the method, apparatuses, and non-transitory computer-readable medium described herein, the first UE may be within a coverage area of the base station and the second UE may be outside the coverage area of the base station.

DETAILED DESCRIPTION

Figure 1:
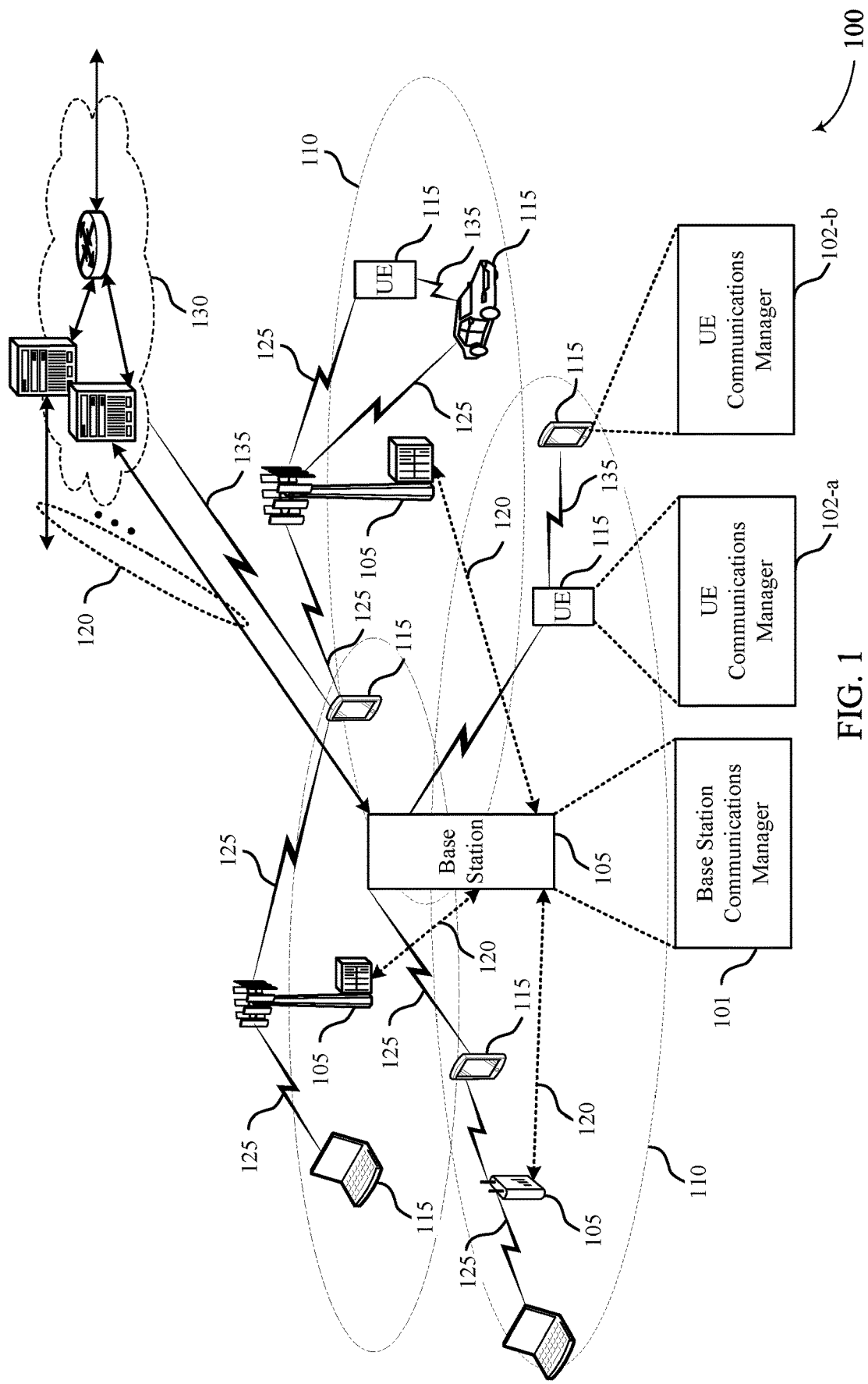
FIG. 1 illustrates an example of a system for wireless communications that supports DRX configuration for sidelink in accordance with one or more aspects of the present disclosure.

A wireless communications system may support both access links and sidelinks for communications between wireless devices. An access link may refer to a communication link between a UE and a base station. For example, an access link may support uplink signaling, downlink signaling, connection establishment and synchronization procedures, etc. A sidelink may refer to communication links between similar wireless devices (e.g., a communication link between UEs or a backhaul communication link between base stations). It is noted that while various examples provided herein are discussed for UE sidelink devices, such sidelink techniques may be used for any type of wireless devices that use sidelink communications. For example, a sidelink may support device-to-device (D2D) communications, vehicle-to-everything (V2X) and/or vehicle-to-vehicle (V2V) communications, message relaying, discovery signaling, beacon signaling, or any combination of these or other signals transmitted over-the-air from one UE to one or more other UEs.

Sidelink communications may be utilized by UEs in various states of coverage within a cell. For example, sidelink communications may include communications between two UEs that are both within a coverage area provided by a base station, between one UE in coverage and another UE outside of coverage (e.g., an out-of-coverage UE), or between two UEs that are both outside of coverage. As these examples illustrate, there may be cases in which a UE may communicate over a sidelink while outside the coverage of a base station, and the UE may therefore lack a direct connection with the network (e.g., via a radio resource control (RRC) link). As a result, an out-of-coverage UE may irregularly monitor for paging signals from the network and may also be unaware of one or more other UEs that may be transmitting information to the out-of-coverage UE via the sidelink communication link. The out-of-coverage UE may thus monitor sidelink resource pools for sidelink transmissions from other UEs. Likewise, UEs that are in-coverage may be unaware of when sidelink transmissions may be sent, and the in-coverage UEs may accordingly monitor sidelink resource pools for transmissions from another UE. In some cases, monitoring for one or more sidelink transmissions by various UEs may be continuous to reduce the number of sidelink transmissions that are missed, and the UEs may consume excess power as a result.

However, as described herein, power saving techniques for sidelink communications may be used to enable reduced power consumption and extended battery life. For example, a UE may be configured with a sidelink DRX cycle, which may enable the UE to discontinuously monitor for transmissions from another UE over a sidelink communication link. As such, one or more sidelink DRX parameters may be provided to UEs to use for sidelink power savings, where the UEs may be in various states of coverage (e.g., with a base station). As a first example, a UE may be in-coverage with a base station and the in-coverage UE may receive the sidelink DRX parameters from the network. The UE may then transmit or relay an indication of the sidelink DRX parameters to another UE (e.g., an out-of-coverage UE) over a sidelink communication link. In other cases, multiple UEs may receive the sidelink DRX parameters from the base station. Additionally or alternatively, an in-coverage UE may select the sidelink DRX parameters, and may transmit an indication of the parameters to one or more other UEs. In any case, the sidelink DRX parameters may be used by the UEs to periodically monitor a sidelink communication link for transmissions from another UE while powering down one or more components (e.g., power amplifiers, radio frequency (RF) chains, etc.) when irregularly monitoring the sidelink communication link. In some other examples, a UE that is out-of-coverage may determine DRX parameters and indicate the DRX parameters to other UEs. For example, in some cases one or more UEs may negotiate DRX parameters and may indicate the determined DRX parameters to other UEs in the network.

In some examples, there may be separate configurations for the sidelink DRX cycle and other DRX cycles for communications between a UE and a base station (e.g., corresponding to a Uu interface between a mobile device and a radio access network). The separate configuration of the sidelink DRX cycle and other DRX cycles may be based on the use of resources for sidelink communications and resources for communication with the base station. For instance, respective carriers (e.g., component carriers (CCs)) may be used for sidelink communications and communications over an access link, and different DRX configurations may accordingly be used for the sidelink and access link. In other cases, different DRX configurations may be used for sidelink communications and access link communications on a same carrier. Additionally or alternatively, a sidelink DRX cycle may be synchronized with a DRX cycle used for communicating with a base station, where the synchronization of the DRX cycles may enable a UE to efficiently transmit to other out-of-coverage UEs, as well as for the UE to receive uplink transmissions (e.g., to be relayed to the base station) from the out-of-coverage UEs. In some cases, a UE that relays transmissions to/from other UEs may indicate its DRX parameters (e.g., as configured for its link with the base station (e.g., the Uu interface)) to the other UEs. As such, the DRX parameters may be signaled over the sidelink to the other UEs.

Aspects of the disclosure are initially described in the context of wireless communications systems. Further examples are then provided of signaling between devices in wireless communications systems and DRX configurations used by a UE for sidelink communications. Aspects of the disclosure are further illustrated by and described with reference to apparatus diagrams, system diagrams, and flowcharts that relate to DRX configurations for sidelink.

FIG. 1 illustrates an example of a wireless communications system 100 that that support DRX configurations for sidelink in accordance with one or more aspects of the present disclosure. The wireless communications system 100 may include base stations 105, UEs 115, and a core network 130. In some examples, the wireless communications system 100 may be an LTE network, an LTE-A network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as described with reference to FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology. In some examples, a UE 115 may communicate with the core network 130 through communication link 135.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as described with reference to FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 megahertz (MHz)). Devices of the wireless communications system 100 (e.g., base stations 105, UEs 115, or both) may have hardware configurations that support communications over a particular carrier bandwidth or may be configurable to support communications over one of a set of carrier bandwidths. In some examples, the wireless communications system 100 may include base stations 105 and/or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into BWPs having the same or different numerologies. In some examples, a UE 115 may be configured with multiple BWPs. In some cases, a single BWP for a carrier is active at a given time, and communications for the UE 115 may be restricted to active BWPs.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some cases, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers. In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, be irregularly aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a predefined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link (e.g., a sidelink communication link 135) may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services. The operators IP services may include access to the Internet, Intranet(s), an IP Multimedia Subsystem (IMS), or a Packet-Switched Streaming Service.

Some of the network devices, such as a base station 105, may include subcomponents such as an access network entity, which may be an example of an access node controller (ANC). Each access network entity may communicate with UEs 115 through a number of other access network transmission entities, which may be referred to as radio heads, smart radio heads, or transmission/reception points (TRPs). Each access network transmission entity may include one or more antenna panels. In some configurations, various functions of each access network entity or base station 105 may be distributed across various network devices (e.g., radio heads and ANCs) or consolidated into a single network device (e.g., a base station 105).

The wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs regarding FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between UEs 115 and base stations 105, and EHF antennas of the respective devices may be smaller and more closely spaced than UHF antennas. In some cases, this may facilitate use of antenna arrays within a device. The propagation of EHF transmissions, however, may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and the UE 115 may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

UEs 115 and base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some cases, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a UE 115 may monitor a communication link 125 (e.g., a wireless link) 115 continuously for an indication that the UE 115 may receive data. In other cases (e.g., to conserve power and extend battery life) a UE 115 may be configured with a DRX cycle. A DRX cycle includes an "On Duration" when the UE 115 may monitor for control information (e.g., on a physical downlink control channel (PDCCH)) and a "DRX period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a base station 105. A UE 115 may receive scheduling messages on PDCCH during the ON Duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

Wireless communications system 100 may support various techniques for power savings when communicating on a sidelink. As an example, a UE 115 may determine one or more sidelink DRX parameters for use when communicating with another UE 115 over a sidelink communication link. The sidelink DRX parameters may be indicated to the UE 115 by a base station 105 or by another UE 115 (e.g., an in-coverage UE 115). In some examples, a UE 115 may select the sidelink DRX parameters from a set of sidelink DRX parameters, and the UE 115 may indicate the selected parameters to another UE 115 (e.g., an out-of-coverage UE 115). Based on the sidelink DRX parameters received, a UE 115 may discontinuously monitor for transmissions from another UE 115 over the sidelink communication link. As such, the UE 115 may refrain from continuously monitoring for sidelink transmissions in accordance with the sidelink DRX parameters (e.g., an ON duration, various sidelink DRX timers, and other DRX parameters), and the UE 115 may thereby save power and reduce battery consumption at the UE 115.

Wireless communications system 100 may further support the separate configuration of DRX cycles. For instance, a sidelink DRX configuration may be different from a DRX configuration used for communications with a base station 105 (e.g., corresponding to a Uu interface). The separate configurations may be based on a CC or multiple CCs used for the sidelink and the access link (e.g., communication link 125), or may be based on a PLMN RF spectrum band used for the sidelink and access link, or based on other communication schemes for sidelink and access link transmissions, or any combination thereof. Here, the separate configurations of DRX cycles may enable a UE 115 to power down respective power amplifiers used for sidelink and access link transmissions, thereby providing a configurable and dynamic power savings at the device.

In other examples described herein, a sidelink DRX configuration may be similar to or the same as a DRX configuration corresponding to the Uu interface. In such cases, parameters for the respective DRX cycles may enable an alignment of the timing for both monitoring for communications from a base station 105 and monitoring for communications from a UE 115. For example, there may be a synchronization of access link and sidelink DRX periods, where an in-coverage UE 115 (e.g., acting as a relay for one or more other UEs 115) may use a UE-specific DRX configuration having some common periodicity or monitoring occasion(s) between a sidelink DRX cycle and other DRX cycles. In some cases, such a relay UE 115 may periodically monitor for transmissions (e.g., including scheduling requests, or other requests to connect to a base station 105) with a certain periodicity from an out-ofcoverage UE 115, while the out-of-coverage UE 115 may, in some cases, monitor for transmissions from the relay UE 115 with a different periodicity. In some examples, DRX configurations may be resource-specific, where different sidelink resources may be associated with respective DRX parameters (e.g., where UEs 115 may be indicated a DRX configuration on a per-resource basis).

One or more of the base stations 105 may include a base station communications manager 101, which may configure one or more sidelink DRX parameters for sidelink communication between a first UE 115 and a second UE 115 over a sidelink communication link 135 and transmit, to the first UE 115, a message indicating the one or more sidelink DRX parameters. The base station communications manager 101 may be an example of aspects of the base station communications manager 1210 described herein.

UEs 115 may include a UE communications manager 102-a, which may determine one or more sidelink DRX parameters for sidelink communication with a second UE and transmit, to the second UE 115 associated with a second communications manager 102-b, an indication of the one or more sidelink DRX parameters, where the indication is transmitted over a sidelink communication link 135 with the second UE 115. The UE communications manager 102-a may also determine one or more sidelink DRX parameters for sidelink communication with a second UE 115 and second communications manager 102-b and discontinuously monitor a sidelink communication link 135 for a transmission from the second UE 115 in accordance with the one or more sidelink DRX parameters. The UE communications managers 102 may examples of aspects of the UE communications manager 810 described herein.

Figure 2A:
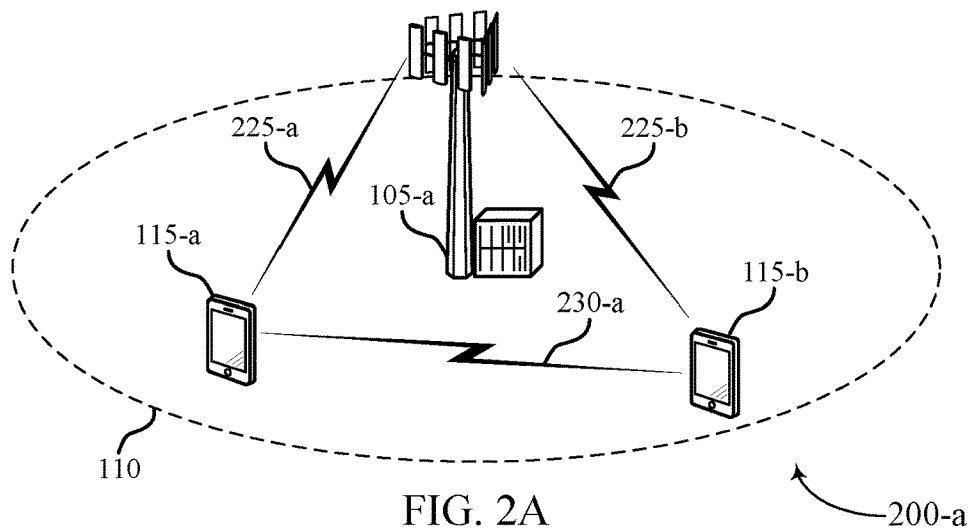
FIGS. 2A, 2B, and 2C illustrate examples of wireless communications systems that support DRX configurations for sidelink in accordance with one or more aspects of the present disclosure.
Figure 2B:
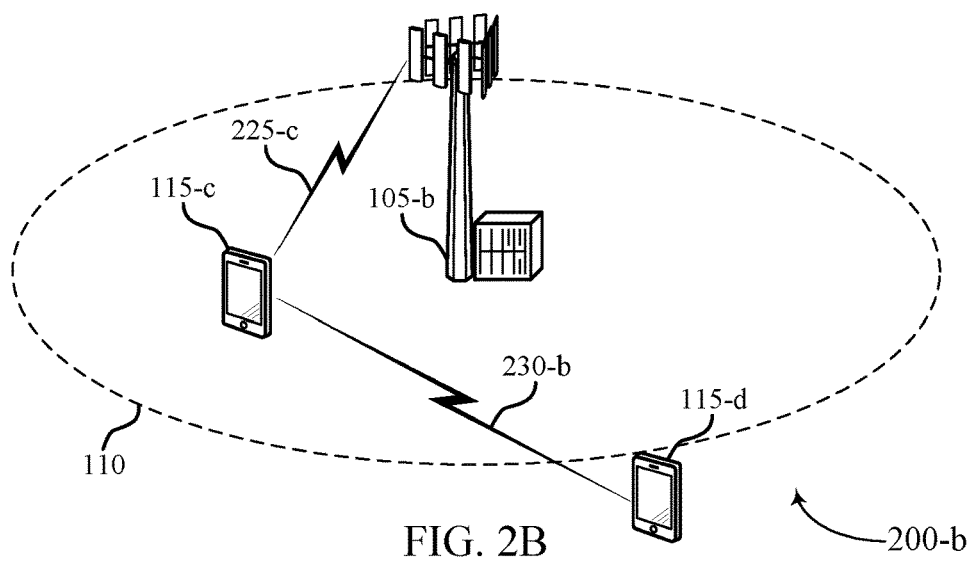
Figure 2C:
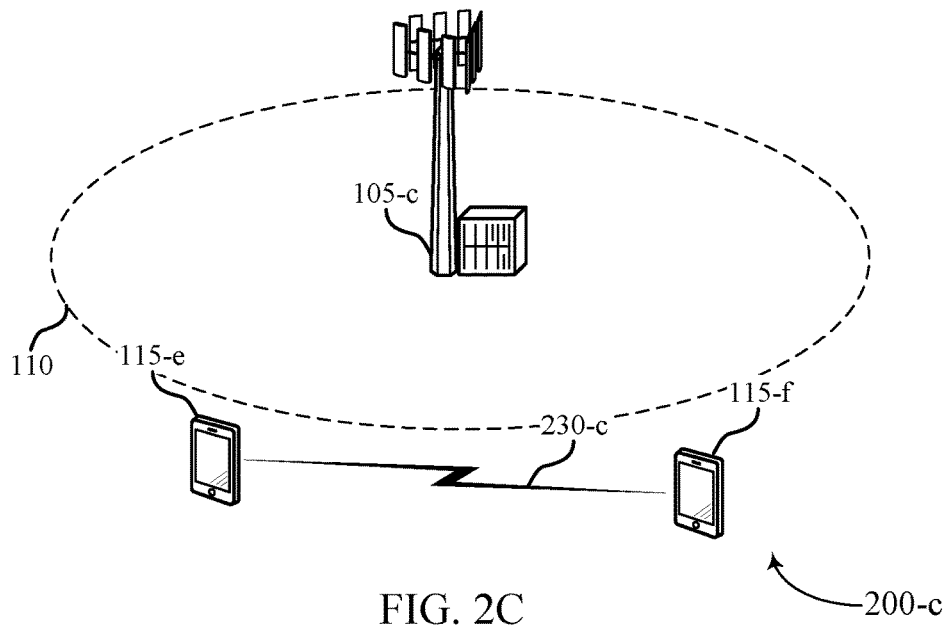

FIG. 2 illustrate examples of wireless communications systems 200-a, 200-b, and 200-c that support power saving techniques for sidelink communication in accordance with one or more aspects of the present disclosure. In some examples, wireless communications systems 200-a, 200-b, and 200-c may implement aspects of wireless communications system 100. For example, wireless communications systems 200-a, 200-b, and 200-c each include a base station 105 (e.g., base station 105-a, base station 105-b, and base station 105-c) and one or more UEs 115 (e.g., UEs 115-a through UE 115-f), which may be examples of the corresponding devices described with reference to FIG. 1. Wireless communications system 200-a, 200-b, and 200-c may illustrate various levels of coverage for UEs 115 that communicate using sidelink communications.

In some cases, a UE 115-a may communicate directly with another UE 115-b (or with another group of UEs 115) over a sidelink connection (e.g., using a peer-to-peer (P2P) or D2D protocol). Such communications may be referred to as D2D or sidelink communications, where a first UE 115 may be scheduled (e.g., by a base station 105 or another UE 115) to transmit data or control information to a second UE 115 over a sidelink. In some cases, a sidelink may be a communication link or a signal transmitted between different UEs 115 in a network, where one UE 115 may act as a relay for information transmitted by another device.

In the example of the wireless communications system 200-a, one or more of a group of UEs 115 (e.g., UE 115-a and UE 115-b) may support sidelink communications in addition to direct communication with a base station 105-a within the coverage area 110 of base station 105-a. In such cases, the UEs 115-a and 115-b may be in-coverage. For example, UE 115-a may communicate with the base station 105-a via communication link 225-a, while maintaining sidelink communications over sidelink 230-a with the UE 115-b. In addition, UE 115-b may communicate with the base station over communication link 225-b while communicating with UE 115-a using the sidelink 230-a. In some in-coverage cases, each UE 115 may be connected to the base station 105 via a direct link (e.g., via a Uu interface).

In the example of wireless communications system 200-b, one or more of a group of UEs 115 (e.g., UE 115-c and 115-d) may support sidelink communication techniques. In the example of FIG. 2B, UE 115-c may be within the coverage area 110 of the base station 105-b, and UE 115-c may communicate directly with the base station 105-b using the communication link 225-c. Additionally, UE 115-d may be outside of the coverage area 110, and may communicate using non-direct links with the base station 105-b (e.g., UE 115-d may not have an established Uu or RRC connection with base station 105-b). In other cases, the UE 115-d may be inside the coverage area 110, but may not be able to communicate directly with the bases station 105-b (e.g., the UE 115-d may experience interference, reduced signal strength, or otherwise impeded communications). In such cases, the UE 115-d may communicate with the UE 115-c using the sidelink 230-b.

In the example of FIG. 2B, the group of UEs 115 may be in partial coverage (e.g., at least one of the UEs may communicate directly with the base station, and at least one other UE may be out of coverage). In such partial-coverage cases, the UE 115 that is in direct communication with the base station (e.g., UE 115-c) may act as a relay for information transmitted from the base station 105-b. For example, the UE 115-c may receive data or control information directly from the base station 105-b via communication link 225-c, and may relay the information via sidelink 230-b to the UE 115-d. In such cases, the UE 115-c may assist communications between the base station 105-b and the out of coverage UE 115-d.

In the example of wireless communications system 200-c, one or more of a group of UEs 115 (e.g., UE 115-e and 115-f) may communicate outside of the coverage area 110 of the base station 105-b using a sidelink. In some examples, the UE 115-e and the UE 115-f may not have a direct connection to the base station 105-c due to both UEs 115 being outside of the geographic coverage area 110 of base station 105-c. In some other examples, the UEs 115 may be inside the geographic coverage area, but may not be able to communicate directly with the base station 105-c (e.g., due to interference, diminished signal strength, etc.). In such cases, the UEs 115 may be out of coverage, and may not have a Uu connection or other direct connection established with the base station 105-c.

UE 115-e may be able to communicate directly with another UE 115-f (or with another group of UEs 115) over the sidelink 230-c. In such communications, the UEs 115 may communicate without direct connection to the base station 105-c. However, as illustrated in wireless communications systems 200-a, 200-b, and 200-c, there may be cases in which a UE 115 is outside the coverage of a base station 105 and therefore may lack a direct, (e.g., RRC) connection with the network while communicating with another UE 115 via one or more sidelinks 230. Such out-of-coverage UEs 115 may not regularly monitor for paging signals from a network, and the out-of-coverage UEs 115 may also be unaware of when other UEs 115 will be transmitting via a sidelink communications link. The out-of-coverage UE 115 and in-coverage UE 115 may monitor sidelink resources (e.g., resource pools) for transmissions from other UEs 115. Such monitoring may be continuous, and the out-of-coverage UE 115 may unnecessarily consume power as a result.

As described herein, techniques may be used to enable power saving at a device communicating via a sidelink 230. As an example, DRX parameters for sidelink communications may be configured for out-of-coverage UEs 115. The sidelink DRX parameters may be configured by a base station 105 and transmitted to an out-of-coverage UE 115 via another UE 115 (e.g., that is in coverage and communicating, via a sidelink communications link, with the out-of-coverage UE 115). Additionally or alternatively, the in-coverage UE 115 may select the sidelink DRX parameters and the UE 115 may signal the parameters to the out-of-coverage UE 115. As such, the out-of-coverage UE 115 may perform DRX for sidelink communications to enable power saving. Further techniques for power saving may include the separate configuration of DRX parameters (e.g., DRX for the in-coverage UE 115 and a base station 105 over the Uu interface) and the sidelink DRX parameters. Alternatively, the parameters for the respective DRX configurations may be the same.

Figure 3A:
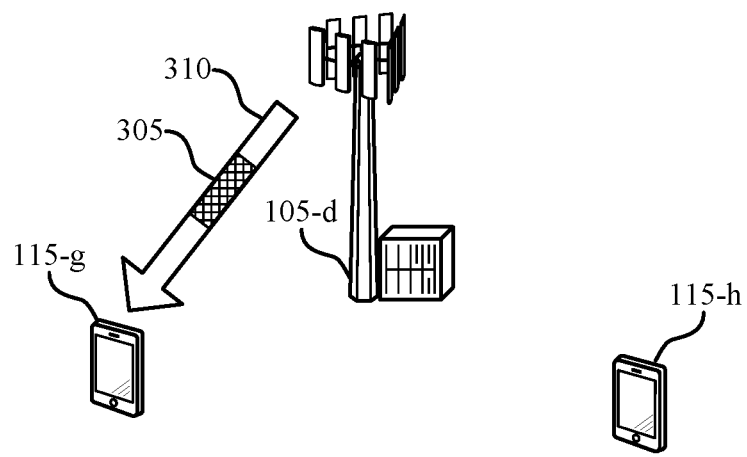
FIGS. 3A, 3B, and 3C illustrates an example of a wireless communication system that supports DRX configurations for sidelink in accordance with one or more aspects of the present disclosure.
Figure 3B:
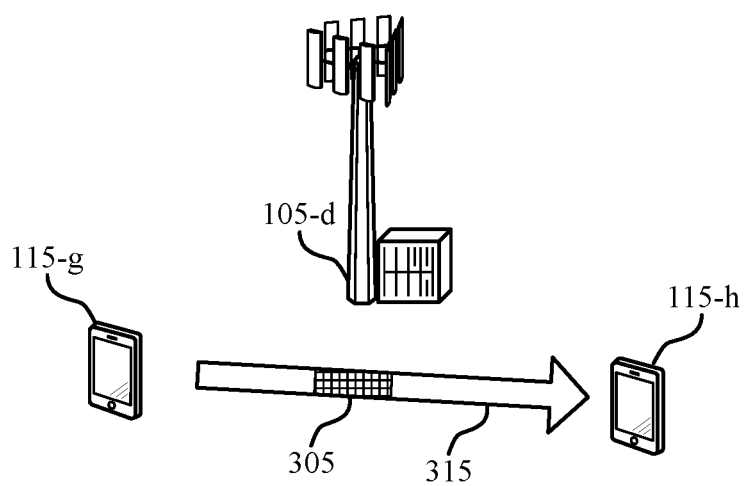
Figure 3C:
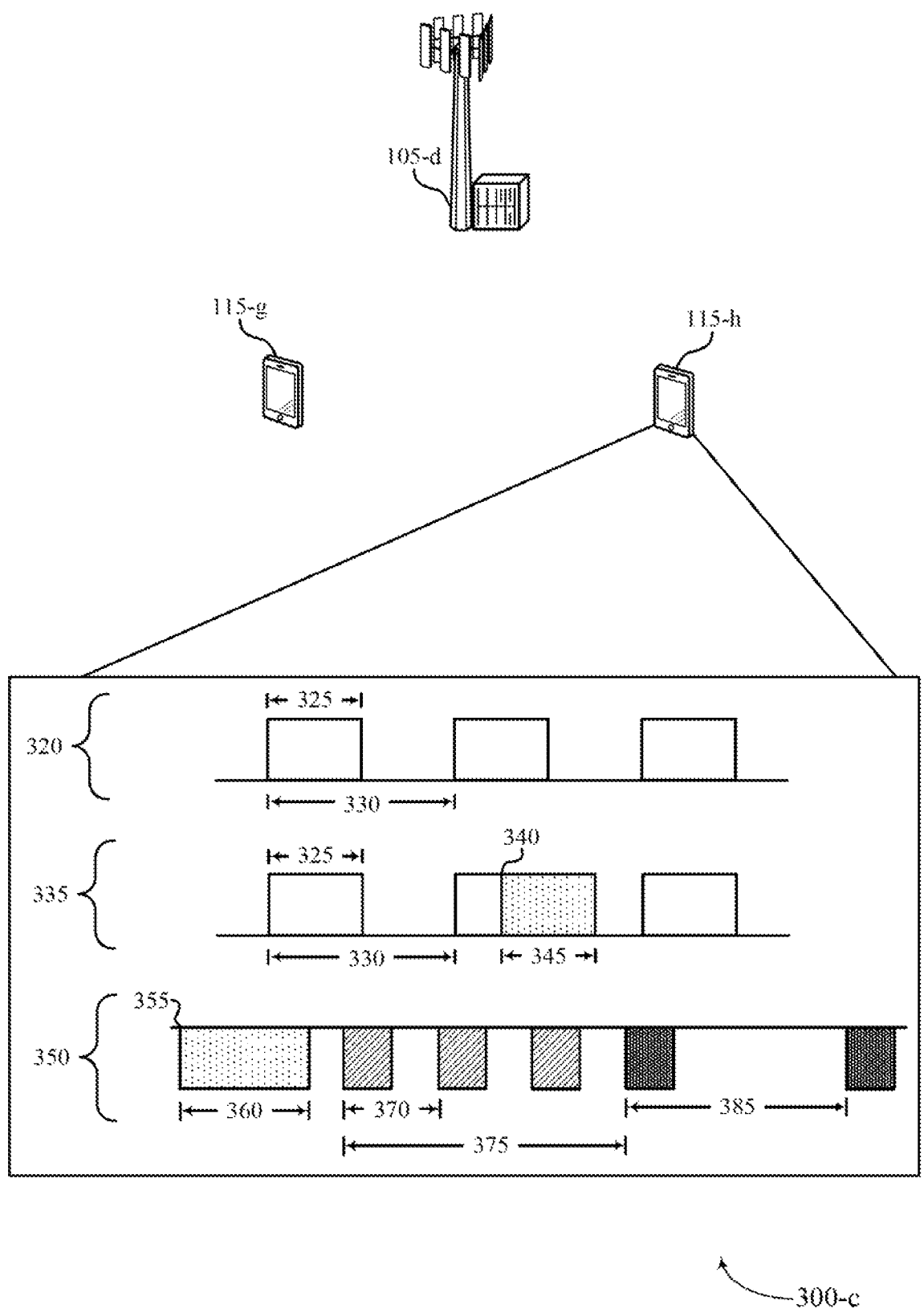

FIGS. 3A, 3B, and 3C illustrate an example of wireless communications systems 300-a, 300-b, and 300-c that support power saving techniques for sidelink communication in accordance with one or more aspects of the present disclosure. In some examples, wireless communications systems 300-a, 300-b, and 300-c may implement aspects of wireless communications systems 100 and 200. For example, wireless communications system 300-a, 300-b, and 300-c each include a base station 105-d and one or more UEs 115 (e.g., UEs 115-g and UE 115-g), which may be examples of the corresponding devices described with reference to FIGS. 1 and 2. Wireless communications system 300-a, 300-b, and 300-c may illustrate the signaling of DRX parameters to UEs 115.

Resources for sidelink communications may be allocated within the wireless communications system 300-a according to a number of different resource allocation techniques. In some implementations, sidelink resources for a PSCCH and a physical sidelink shared channel (PSSCH) may be scheduled by the base station 105-d. For example, the base station 105-d may receive an indication that UE 115-g is to facilitate sidelink communications with a target UE 115-h. In some examples, the target UE 115-h may be out of coverage of the base station 105-d. The base station may transmit an indication 305 to UE 115-g using communication link 310 to indicate resources that the UE 115-g may use to communicate with the UE 115-h. For example, the indication 305 may be DCI transmitted on the PDCCH. The DCI may include a PSCCH period or a set of sidelink slots that the UE 115-g may use to transmit data to the UE 115-h. The UE 115-g may transmit information using the PSCCH and the PSSCH to UE 115-h using the indicated resources (e.g., the UE may transmit PSCCH and PSSCH together within the indicated PSCCH period).

Additionally or alternatively, the indication 305 transmitted by the base station 105-d may indicate a set of resource pools (e.g., including uplink resource pools and downlink resource pools) that the UE 115-g may use to transmit information to the UE 115-h. In such examples, the UE 115-g may receive DCI which activates one of a set of available resource pools that the UE 115-g may use. In some other examples, the UE 115-g may select one resource pool form the set of available resource pools without receiving DCI.

After receiving information from the base station 105-d, the UE 115-g may communicate with the UE 115-h using a sidelink connection 315. In some aspects, the UE 115-g may act as a relay between base station 105-d and UE 115-h. For example, the UE 115-g may receive an indication of various transmission resources it may use to communicate with the UE 115-h according to methods described with reference to FIG. 3A. The UE 115-g may select a configured PSCCH/PSSCH period to transmit PSCCH and PSSCH to the UE 115-h in a single slot or a set of slots of the PSCCH/PSSCH period. Additionally or alternatively, the UE 115-g may select an available resource pool to use to transmit PSCCH and PSSCH to the UE 115-h (e.g., which may be done without instruction or signaling from the base station 105-d). After resource allocation, the UE 115-g may transmit data to the UE 115-h using the configured resources.

In some aspects, the PSCCH transmitted by UE 115-g to the target UE 115-h during sidelink communications may be analogous to a PDCCH which may be transmitted from the base station 105-d to the UE 115-g during initial communications described with reference to FIG. 3A. In addition, a PSSCH which may be transmitted by the UE 115-g to the UE 115-h during sidelink communication may be analogous to a physical downlink shared channel (PDSCH) or a physical uplink shared channel (PUSCH) which may be transmitted by the base station 105-d or a UE 115, respectively.

In some cases, UEs 115 within a network may be configured to monitor a control channel discontinuously in order to increase power savings. For example, the UEs 115 may implement sidelink DRX methods which may allow a UE 115 to turn off its receiver, power amplifier, and/or other components of an RF chain during periods of inactivity, and turn on its receiver or RF chain components during times where the UE 115 may be configured to receive data on a sidelink. In such cases, a UE 115 may be configured with a sidelink DRX cycle, which may indicate various time periods or a periodicity at which the UE 115 may monitor a control channel. For example, UEs 115 within the network may use a configured sidelink DRX cycle to monitor PDCCH for communications with a base station 105, and UEs 115 may also use a configured sidelink DRX cycle to monitor PSCCH for sidelink communications.

In one example, base station 105-d may configure a sidelink DRX configuration for a number of UEs 115. In some other examples, however, a UE 115 that is out of coverage (e.g., UE 115-h) may receive an indication of a sidelink DRX configuration via sidelink communications with another UE 115 that is in coverage (e.g., UE 115-g). A sidelink DRX configuration may be indicated to the receiving UE 115 (e.g., UE 115-h) according to different aspects of communications established within the network.

In some cases, the UE 115-h may be out-of-coverage (e.g., UE 115-h may not be Uu connected, and UE 115-h may not have an RRC connection with base station 105-d). As a result, the UE 115-h may not monitor for paging information from the base station 105-d, (e.g., as it may otherwise perform according to an RRC idle mode). In such cases, a sidelink DRX configuration may be indicated or relayed to the UE 115-h by another UE 115, for example, by UE 115-g.

There may be a number of different ways in which the sidelink DRX configuration may be selected for the UE 115-h. In one implementation, the base station 105-d may select the sidelink DRX parameters for the UE 115-h. This implementation may, in some aspects, be used for partial-coverage scenarios (e.g., where at least one UE 115 is in coverage of the base station 105-*d*). The base station 105-*d* may receive an indication that a source UE 115 (e.g., UE 115-*g*) may communicate with one or multiple out of coverage UEs 115 present in the network. The base station 105-*d* may then select parameters for a sidelink DRX configuration for the out of coverage UEs, and the base station 105-*d* may transmit the sidelink DRX parameters to the source UE 115-*g*. In some cases, the base station 105-*d* may transmit the sidelink DRX parameters on a PDSCH according to the signaling described with reference to FIG. 3A (e.g., via indication 305). The UE 115-*g* may receive the sidelink DRX parameters from the base station 105-*d*, and UE 115-*g* may transmit or relay the sidelink DRX parameters via a sidelink (e.g., via PSSCH) to the UE 115-*h* according to the signaling described with respect to FIG. 3B.

In another implementation, sidelink DRX parameters for UE 115-*h* may be selected by the UE 115-*g* (e.g., without direct communication from the base station). In such implementations, the source UE 115-*g* may select a sidelink DRX cycle based on its own DRX cycle (this DRX cycle may be configured by the base station 105-*d*). In addition, the source UE 115-*g* may select sidelink DRX parameters that are compatible with values of its own DRX cycle or wake up durations. The UE 115-*g* may relay these sidelink DRX parameters to UE 115-*h*, or to various other out of coverage UEs. In some other cases, the target UE 115-*h* may be in coverage of the base station 105-*d*, but may still receive a DRX configuration from the source UE 115-*g*.

Implementations in which a UE may configure a sidelink DRX configuration for another UE 115 may be used, for example, in partial coverage scenarios, or for out of coverage scenarios with an established master-slave architecture. In examples where all of the UEs are out of coverage, a master-slave architecture may be implemented where one UE 115 is designated as a master (e.g., a source UE 115 such as UE 115-*g* may be a master), and other UEs 115 may be designated as slaves (e.g., a target UE 115 such as UE 115-*h* may be a slave). In this case, the master UE 115 may be a central entity in the group, and UE 115 may pick various sidelink DRX configuration parameters that it may transmit to the other UEs 115 in the group.

The source UE 115-*g* may send the sidelink DRX parameters to the target UE 115-*h* using various signaling techniques. In one example, the source UE 115-*g* may send the sidelink DRX parameters over a sidelink connection using a MAC CE of a PSSCH. Additionally or alternatively, the sidelink DRX parameters may be indicated in SCI (e.g., the target UE 115-*h* may receive a DCI via the PSCCH from transmitted from the target UE 115-*g*). The target UE 115-*h* (or in some cases, group of target UEs) may be associated with a destination identity (ID) (or group destination ID). The source UE 115-*g* may transmit the destination ID in addition the sidelink DRX configuration, and based on the destination ID, the target UE 115-*h* may determine if it may receive the transmitted message. In some cases, the destination ID may include a groupcast destination ID or a unicast destination ID. Additionally, as part of a configuration of sidelink resource pools (e.g., resource pools used for receiving and transmitting sidelink communications), the sidelink DRX parameters may also be configured (e.g., as part of a resource pool configuration). As such, if some UEs are out of coverage, the UEs may determine when to monitor for sidelink transmissions based on the DRX parameters included within a resource pool configuration.

In some examples, a MAC entity may be configured by RRC with sidelink DRX functionality that may in some aspects control PDCCH or PSCCH monitoring activity at a UE 115 (e.g., UE 115-*g*) for the various radio network temporary identifier (RNTI) configurations of the MAC entity. For example, some RNTI configurations may include C-RNTI, CS-RNTI, INT-RNTI, SFI-RNTI, SP-CSI-RNTI, PRC-PUCCH-RNTI, and TPC-SRS-RNTI. In some cases where the UE 115 is in RRC_Connected mode and configured for DRX, the MAC entity may monitor the PDCCH discontinuously (e.g., using various ON occasions and an OFF occasions) for each serving cell. In some other cases where the UE is in an RRC_Idle mode, the UE 115 may monitor paging occasions transmitted by the base station, and UE 115 may monitor the PDCCH to detect a paging message. If the UE 115-*g* receives a paging message, it may wake up, but if it does not receive a paging message, it may remain in an idle mode.

A number of different parameters may be considered in determining the sidelink DRX configuration for a UE 115. Some DRX parameters (e.g., given by RRC) may include, for example, a drx-onDurationTimer, which may indicate the duration at the beginning of a DRX Cycle and a drx-SlotOffset which may indicate the delay before starting the drx-onDurationTimer. Further parameters may include a drx-InactivityTimer to indicate the duration after the PDCCH occasion in which a PDCCH indicates a new uplink or downlink transmission for the MAC entity, a drx-LongCycleStartOffset which may indicate the Long DRX cycle, and drx-StartOffset which defines the subframe where the Long and Short DRX Cycle starts. A drx-ShortCycle may be included to indicate the Short DRX cycle, and a drxShortCycleTimer may be included to indicate the duration that the UE 115 may follow the Short DRX cycle. It is also noted that additional or different DRX parameters other than those described herein may be used for a sidelink DRX configuration and are omitted for the sake of brevity.

The UE 115-*h* may receive an indication of various sidelink DRX configurations via a sidelink connection with UE 115-*g*. In a first example of a DRX configuration, a sidelink DRX configuration 320 may include a number of ON and OFF durations according to a configured periodicity. The sidelink DRX configuration may include an ON duration of a given length 325, and an OFF duration of a given length (e.g., the OFF duration may have the same duration as the ON duration). A sidelink DRX cycle 330 may be defined by a time period that passes during one ON duration and one OFF duration. The sidelink DRX configuration 320 may indicate the times at which a UE monitors a control channel, for example, the UE 115-*h* may monitor the PSCCH during ON durations 325.

In some cases, a sidelink DRX configuration (e.g., sidelink DRX configuration 335) may include an inactivity timer associated with the reception of a control channel signal. The sidelink DRX configuration 335 may include a number of ON and OFF durations according to a configured periodicity, and the sidelink DRX cycle 330 may be a time period that passes during the completion of one ON duration and one OFF duration. During and ON duration 325, the UE 115-*h* may receive a PSCCH at 340. After receiving the PSCCH, the ON duration (where the PSCCH was received) may be extended by an amount 345, which may be configured by the inactivity timer. In some cases, the inactivity timer may extend the OFF duration to be longer than the ON duration 325 (e.g., longer than the ON duration if no PSCCH is received). In some cases, the inactivity timer may indicate that the ON duration may be extended for a given amount of time, for example, in order for the UE 115-*h* to receive data. After the inactivity timer expires, the UE 115-*h* may return to a sleep or idle state, and may continue to wake up periodically to monitor PSCCH according to the sidelink DRX configuration 335.

In some implementations, long and short DRX cycles may be included in sidelink DRX configuration 350. In one example, UE 115-h may detect a PSCCH at 355 at the beginning of the sidelink DRX cycle. The PSCCH may initiate an inactivity timer, which may span the duration 360, and the inactivity timer may remain on for an amount of time after the UE receives the PSCCH. After the inactivity timer completes, a short sidelink DRX cycle may be configured (e.g., the DRX cycle duration 370 for the short DRX cycle may be shorter than a threshold DRX cycle length). Additionally, a drxShortCycleTimer may be configured to span the time period 375, which may include a number of short DRX cycles 370. After the expiration of the sidelink DRX short cycle timer (and in the case where the UE does not receive PSCCH during the sidelink DRX short cycle time period 375), a long DRX cycle may be configured (e.g., the sidelink DRX cycle duration 385 for the long sidelink DRX cycle may be longer than a threshold sidelink DRX cycle duration). After the completion of the long sidelink DRX cycle, (and in cases where the UE does not receive PSCCH during the long DRX cycle), the UE 115-h, may power down one or more components of an RF chain, or may otherwise return to an idle mode.

Figure 4:
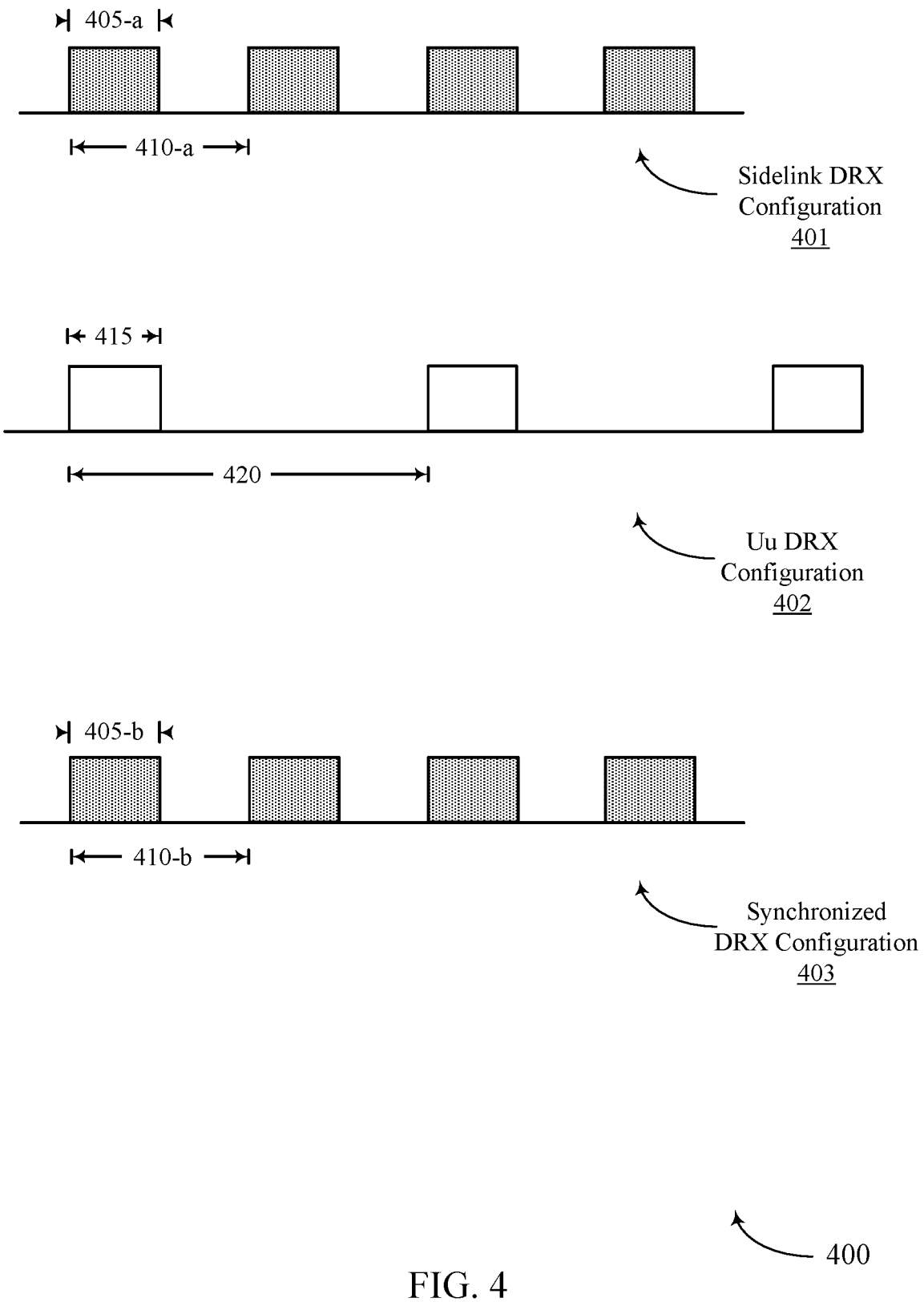
FIG. 4 illustrates an example of DRX configurations that support DRX configurations for sidelink in accordance with one or more aspects of the present disclosure.

FIG. 4 illustrates an example of various DRX configurations 400 that that support DRX configurations for sidelink in accordance with one or more aspects of the present disclosure. In some examples, the DRX configurations 400 may implement aspects of wireless communications systems 100, 200, and 300.

In some cases, a UE 115 may be configured with multiple DRX configurations. For example, a UE may be configured with a DRX configuration from a base station and a sidelink DRX configuration. If a UE 115 (for example, a source UE 115 that may relay uplink and downlink transmissions for out of coverage UEs 115) is in coverage (e.g., has a Uu connection), the UE 115 may be configured with a DRX from the base station 105. Additionally or alternatively, the UE 115 may be configured with both the sidelink DRX and the Uu DRX.

In some examples, the DRX configurations (e.g., the sidelink DRX and Uu DRX configurations) may be configured separately, such that the DRX parameters may be separate for the different configurations. For example, if the Uu link and the sidelink may be established on different carriers (e.g., on different inter-band CCs). Additionally or alternatively, the Uu and sidelinks may be on different frequency ranges (e.g., Uu on FR1 and sidelink FR2), and DRX for Uu and the sidelink may be configured separately. In some other cases, the UE 115 may transmit sidelink communications according to a first operator's (PLMN) band, but may receive sidelink in another PLMN's band. In such cases, Uu and sidelink DRX may be configured separately.

In addition, there may be cases where one UE 115 associated with one network (e.g., PLMN X) may transmit/receive sidelink in another network (e.g., PLMN Y). In such cases, one operator may transmit or receive sidelink communications in another operator's band. In one example, a first UE may be associated with one operator and a second UE may be associated with another operator. Then, for various operations (e.g., for gaming or other device operations) the first UE and the second UE may set up a sidelink such that one of the users may roam in other operator's band (e.g., for transmissions and/or reception of a sidelink communication). This way, the first UE and the second UE configured with different operators may still utilize the same band. In this case, DRX may be configured differently for sidelink and Uu.

In some implementations, the component carriers (CCs) associated with each UE are connected to different power amplifiers (PAs) and likely to different RF chains. Therefore, in cases where different DRX configurations are configured based on separate links, one or both of the RF chains may be turned off. Stated alternatively, there are cases where all of the CCs are connected to one RF chain, such that if one UE 115 is woken up, all of the UEs associated with that RF chain may also be woken up. However, if multiple UEs are associated with different RF chains, and a CC associated with one RF chain is woken up, a different CC associated with another RF chain may remain idle (e.g., in cases for communications on FR1 and FR2, or for the case of inter-band CC). This may reduce the number of blind decodes performed by the UE 115 because a select number of CCs may be monitored, which may increase power savings.

There may be some cases where sidelink and Uu BWPs are on the same carrier. In such cases, DRX configurations between sidelink and Uu may be different. The base station still may have the option to make the DRX configurations the same, however, the configurations may also be kept separate. In some cases, the configuration signaling for sidelink BWPs may be separate from the configuration signaling for uplink BWPs. In such cases, a UE 115 may not be expected to use different numerologies in a configured sidelink BWP and an active uplink BWP in the same carrier at a given time. In some cases, the BWP may be defined for sidelink. In a licensed carrier, the sidelink BWP may be defined separately from the uplink BWP or defined relative to the uplink BWP.

In another example, the DRX configurations may be kept separate, because identical DRX configurations may be based on the tightest requirements of Uu and sidelink.

FIG. 4 illustrates an example of various DRX configurations 400. The sidelink DRX configuration 401 may have an ON duration according to time period 405-a, and a DRX cycle duration of 410-a. The sidelink DRX configuration 401 may be a configuration that a UE 115 may communicate via a sidelink to another UE 115 within the network. The Uu DRX configuration 402 may similarly include an ON duration according to the time period 415, and a DRX cycle duration of 420. In some examples, such as the example described with reference to FIG. 4, the DRX cycle duration associated with the Uu DRX configuration 402 may be greater than the DRX cycle duration associated with the sidelink DRX configuration 401.

In cases where DRX configurations may not be kept separate for different UEs 115, the base station 105 or source UE 115 may select a DRX cycle associated with the greatest number of ON durations (e.g., the sync DRX configuration). In cases where the UE 115 selects the synchronized DRX configuration 403, the UE 115 may monitor more PDCCHs over a larger portion of time.

In cases where the DRX configurations may be kept separate for different UEs 115, however, the base station 105 or source UE 115 may select a DRX configuration with the least number of ON durations (e.g., the least number of monitoring occasions), which may increase power savings and limit the number of times a target UE 115 may wake up to monitor for a control channel transmission. In addition, if the configurations are kept separate, the UE 115 may monitor a smaller number of PDCCH candidates. For example, for cases where the DRX is configured separately for separate devices, the UE 115 may use the sidelink DRX configuration 401 for sidelink communications, and the UE 115 may use the Uu DRX configuration 402 for Uu communications (rather than using the sidelink DRX configuration 401 for all communications).

In some cases, a synchronized DRX configuration 403 may be used when a UE 115 is in coverage and configured to relay packets to one or more remote (e.g., out-of-coverage) UEs 115. In such cases, the relay UE 115 may have a UE-specific DRX periodicity. Further, because the relay UE 115 may relay transmissions to/from other remote UEs 115, the relay UE 115 may utilize a monitoring periodicity that is common to multiple DRX periods (e.g., using some common denominator or parameter between the two or more DRX configurations). In some cases, different remote UEs 115 may monitor the relay UE 115 according to different DRX periods (e.g., different sidelink DRX periods).

The relay UE 115 may periodically monitor for requests (e.g., scheduling request-like transmissions) from the one or more out-of-coverage UEs 115. As an illustrative example, the relay UE 115 may assist a remote, out-of-coverage UE 115 to connect to a base station 105. The remote UE 115 may generate uplink traffic to be relayed to the base station via the relay UE 115. Similar to examples where the relay UE 115 may monitor for PDCCH paging from the base station, the relay UE 115 may monitor for such requests from the remote UE 115. The monitoring periods may be known to both the relay UE 115 and remote UEs 115. In some cases, the monitoring periods may be allocated or configured by the base station. In some cases, the base station may signal an indication of the monitoring periods to one or more UEs 115. In some examples, the relay UE 115 may synchronize its monitoring periods with respect to the base station and remote UE(s) 115, which may provide for efficient monitoring and reduced power consumption at the relay UE 115. Thus, by using synchronized DRX configuration 403, a UE 115 may efficiently monitor for transmissions from a base station and from one or more remote UEs 115, which may facilitate data traffic for the one or more remote UEs 115.

In some cases, there may be multiple resource pool configurations for sidelink transmissions between UEs in a network. In such cases, the DRX parameters may be configured separately for each of the resource pools (e.g., DRX configurations may be allocated per resource pool). In some cases, each UE 115 may be informed about a sidelink DRX configuration on a per-resource pool basis.

Figure 5:
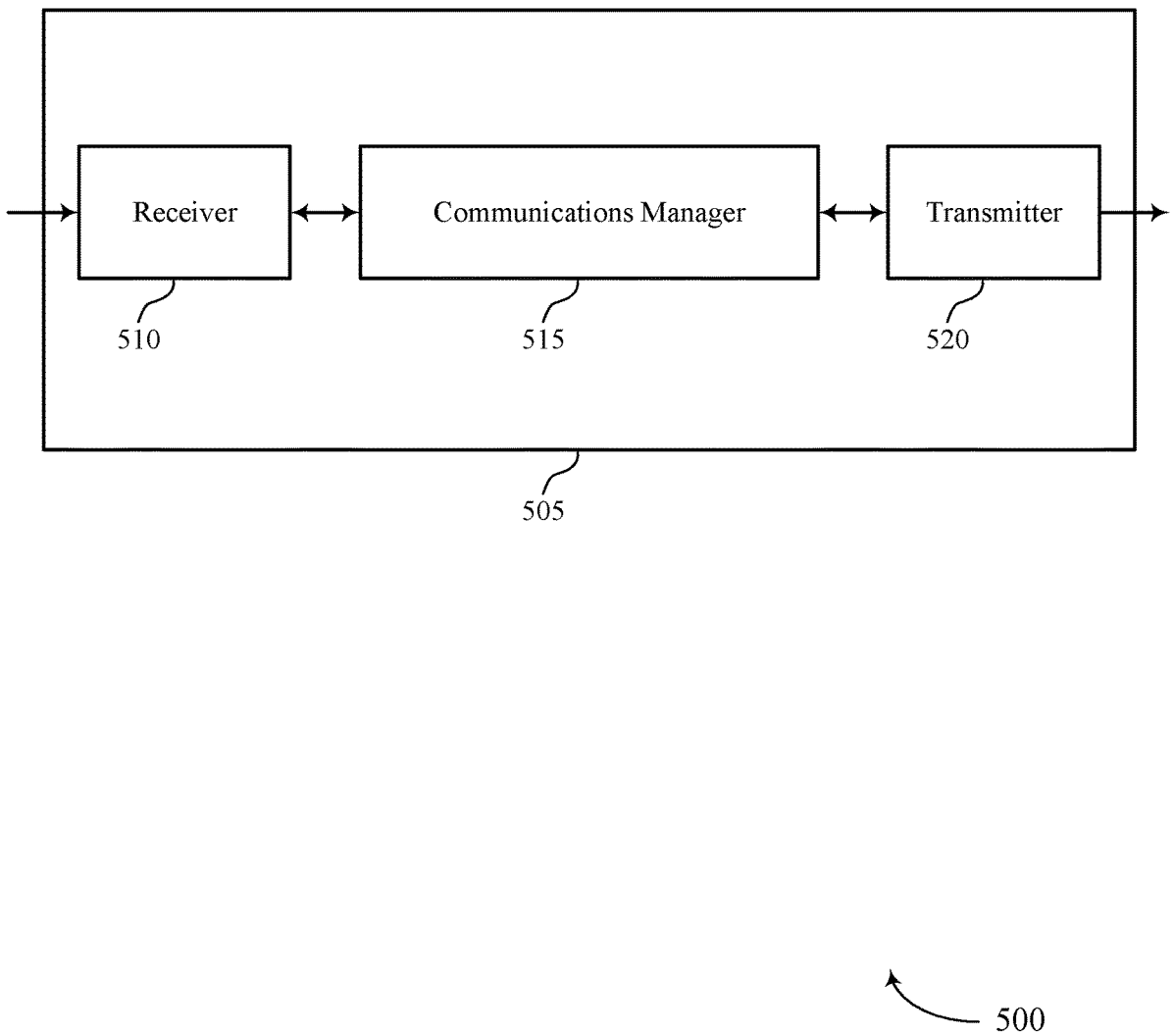
FIGS. 5 and 6 show block diagrams of devices that support DRX configurations for sidelink in accordance with one or more aspects of the present disclosure.

FIG. 5 shows a block diagram 500 of a device 505 that supports DRX configurations for sidelink in accordance with one or more aspects of the present disclosure. The device 505 may be an example of aspects of a UE 115 as described herein. The device 505 may include a receiver 510, a UE communications manager 515, and a transmitter 520. The device 505 may also include a processor. Each of these components may be in communication with one another (e.g., via one or more buses).

The receiver 510 may provide a means for receiving information such as packets, user data, or control information associated with various information channels (e.g., control channels, data channels, and information related to DRX configurations for sidelink, etc.). Information may be passed on to other components of the device 505. The receiver 510 may be an example of aspects of the transceiver 820 described with reference to FIG. 8. The receiver 510 may utilize a single antenna or a set of antennas.

The UE communications manager 515 may be configured to provide or support a means for determining one or more sidelink DRX parameters for sidelink communication with a second UE and transmit, to the second UE, an indication of the one or more sidelink DRX parameters, where the indication is transmitted over a sidelink communication link with the second UE. The UE communications manager 515 may also be configured to provide or support a means for determining one or more sidelink DRX parameters for sidelink communication with a second UE and discontinuously monitor a sidelink communication link for a transmission from the second UE in accordance with the one or more sidelink DRX parameters. The UE communications manager 515 may be an example of aspects of the UE communications manager 810 described herein.

The UE communications manager 515 may be an example of means for performing various aspects of managing DRX configurations for sidelink as described herein. The communications manager 515, or its sub-components, may be implemented in hardware (e.g., in communications management circuitry). The circuitry may comprise of processor, digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

In another implementation, the UE communications manager 515, or its sub-components, may be implemented in hardware, code (e.g., as communications management software or firmware) executed by a processor, or any combination thereof. If implemented in code executed by a processor, the functions of the UE communications manager 515, or its sub-components may be executed by a general-purpose processor, a DSP, an ASIC, a FPGA, or other programmable logic device, discrete gate or transistor logic, discrete hardware components, or any combination thereof designed to perform the functions described in the present disclosure.

In some examples, the UE communication manager 515 may be configured to perform various operations (e.g., determining, transmitting, etc.) using or otherwise in cooperation with the receiver 510, the transmitter 520, or both.

The UE communications manager 515, or its sub-components, may be physically located at various positions, including being distributed such that portions of functions are implemented at different physical locations by one or more physical components. In some examples, the UE communications manager 515, or its sub-components, may be a separate and distinct component in accordance with various aspects of the present disclosure. In some examples, the UE communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
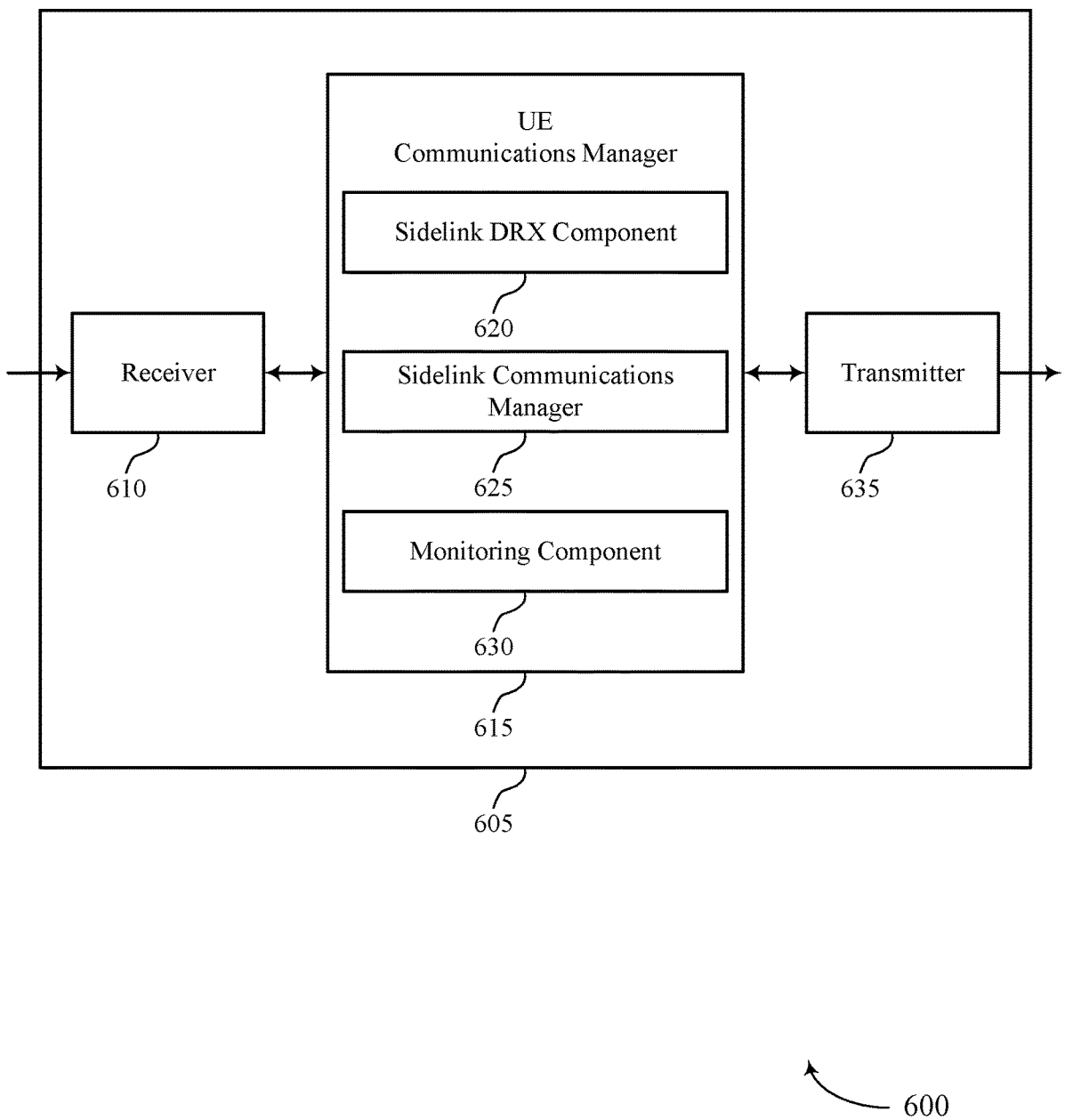

FIG. 6 shows a block diagram 600 of a device 605 that supports DRX configurations for sidelink in accordance with one or more aspects of the present disclosure. The device 605 may be an example of aspects of a device 505, or a UE 115 as described herein. The device 605 may include a receiver 610, a UE communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to DRX configurations for sidelink, etc.). Information may be passed on to other components of the device 605. The receiver 610 may be an example of aspects of the transceiver 820 described with reference to FIG. 8. The receiver 610 may utilize a single antenna or a set of antennas.

The UE communications manager 615 may be an example of aspects of the UE communications manager 515 as described herein. The UE communications manager 615 may include a sidelink DRX component 620, a sidelink communications manager 625, and a monitoring component 630. The UE communications manager 615 may be an example of aspects of the UE communications manager 810 described herein.

The sidelink DRX component 620 may provide a means for determining one or more sidelink DRX parameters for sidelink communication with a second UE.

The sidelink communications manager 625 may provide a means for transmitting, to the second UE, an indication of the one or more sidelink DRX parameters, where the indication is transmitted over a sidelink communication link with the second UE.

The sidelink DRX component 620 may provide a means for determining one or more sidelink DRX parameters for sidelink communication with a second UE.

The monitoring component 630 may provide a means for discontinuously monitoring a sidelink communication link for a transmission from the second UE in accordance with the one or more sidelink DRX parameters.

The transmitter 635 may provide a means for transmitting signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

In some examples, communications manager 615 may be implemented as an integrated circuit or chipset for a mobile device modem, and the receiver 610 and transmitter 620 may be implemented as analog components (e.g., amplifiers, filters, antennas, etc.) coupled with the mobile device modem to enable wireless transmission and reception.

The communications manager 615 as described herein may be implemented to realize one or more potential advantages. Various implementations may enable the communications manager 615 to implement a DRX cycle for monitoring for a transmission from another device in the network. At least one implementation may enable the communications manager 615 to support sidelink communications between devices in accordance with a configured DRX cycle.

Based on implementing the power saving techniques as described herein, one or more processors of the device 605 (e.g., processor(s) controlling or incorporated with one or more of receiver 610, communications manager 615, and transmitter 620) may reduce the amount of time a device is awake and consuming excess power, which may increase power savings. In addition, the processors of the device 605 may be configured to turn off or remain in a low power mode in accordance with the DRX cycle, which may reduce excess power consumption at the device 605.

Figure 7:
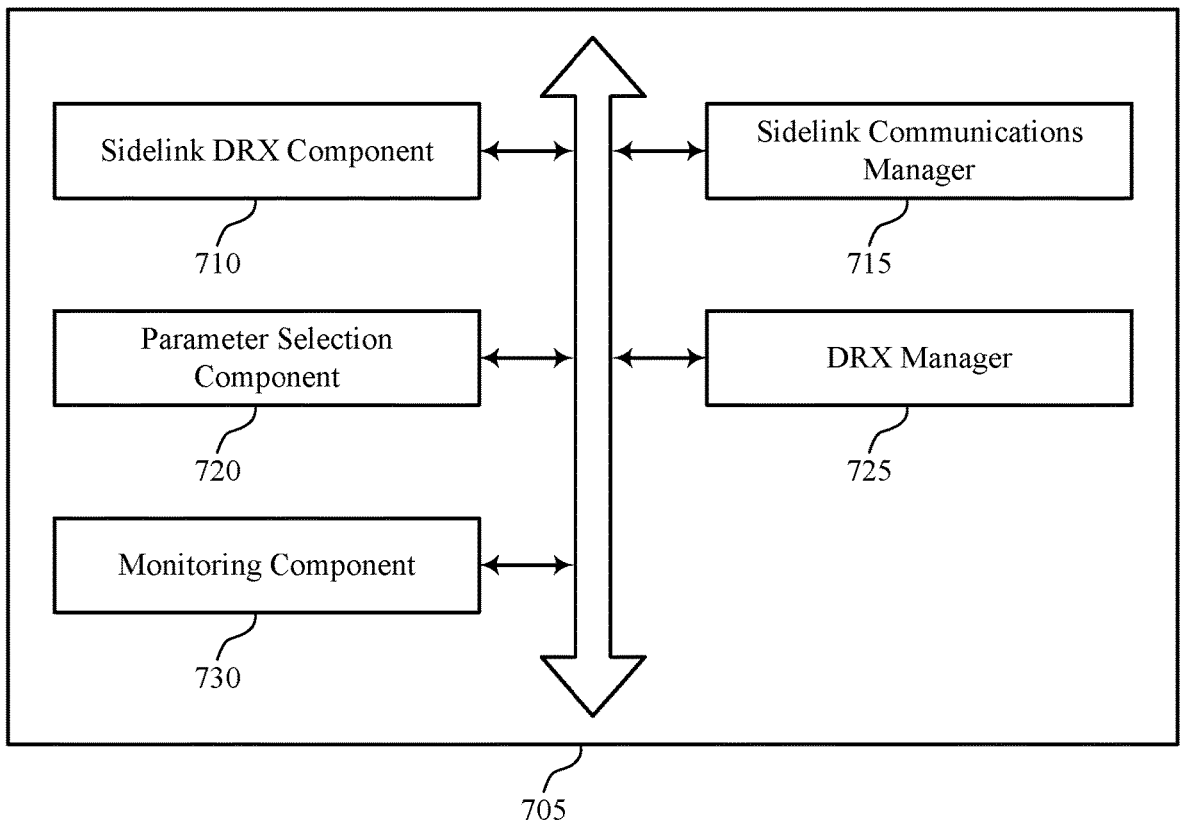
FIG. 7 shows a block diagram of a UE communications manager that supports DRX configurations for sidelink in accordance with one or more aspects of the present disclosure.

FIG. 7 shows a block diagram 700 of a UE communications manager 705 that supports DRX configurations for sidelink in accordance with one or more aspects of the present disclosure. The UE communications manager 705 may be an example of aspects of a UE communications manager 515, a UE communications manager 615, or a UE communications manager 810 described herein. The UE communications manager 705 may include a sidelink DRX component 710, a sidelink communications manager 715, a parameter selection component 720, a DRX manager 725, and a monitoring component 730. Each of these modules may communicate, directly or indirectly, with one another (e.g., via one or more buses).

The sidelink DRX component 710 may provide a means for determining one or more sidelink DRX parameters for sidelink communication with a second UE. In some examples, the sidelink DRX component 710 may provide a means for determining one or more sidelink DRX parameters for sidelink communication with a second UE. In some examples, the sidelink DRX component 710 may provide a means for receiving, from a base station, a message indicating the one or more sidelink DRX parameters for the second UE.

In some examples, the sidelink DRX component 710 may provide a means for transmitting an indication of a destination identity that corresponds to an identity of the second UE, where the one or more sidelink DRX parameters are identified based on the destination identity. In some examples, the sidelink DRX component 710 may provide a means for transmitting the indication to the second UE via SCI, or a MAC control element, or a combination thereof.

In some examples, the sidelink DRX component 710 may provide a means for transmitting the DCI to the second UE on a physical sidelink control channel. In some examples, the sidelink DRX component 710 may power down a second power amplifier for the sidelink communication link in accordance with the one or more sidelink DRX parameters. In some examples, the sidelink DRX component 710 may provide a means for receiving, from the second UE, an indication of the one or more sidelink DRX parameters, the indication received over the sidelink communication link, where the one or more sidelink DRX parameters are determined based on the received indication.

In some examples, the sidelink DRX component 710 may provide a means for receiving the indication of the one or more sidelink DRX parameters from the second UE via SCI, or a MAC control element, or a combination thereof. In some examples, the sidelink DRX component 710 may provide a means for receiving the DCI from the second UE on a physical sidelink control channel. In some examples, the sidelink DRX component 710 may provide a means for receiving, from a base station, a message indicating the one or more sidelink DRX parameters for the second UE, where the one or more sidelink DRX parameters are determined based on the received indication.

In some examples, the sidelink DRX component 710 may provide a means for receiving the one or more sidelink DRX parameters based on a destination identity corresponding to an identity of the first UE, where discontinuously monitoring the sidelink communication link is based on identifying the one or more sidelink DRX parameters. In some cases, the one or more sidelink DRX parameters includes an ON duration, an offset duration, an inactivity timer, one or more cycle durations, a cycle timer, or any combination thereof.

In some cases, the first UE is within a coverage area of a base station. In some cases, the first UE and the second UE are outside a coverage area of a base station. In some cases, the one or more sidelink DRX parameters includes an ON duration, an offset duration, an inactivity timer, one or more cycle durations, a cycle timer, or any combination thereof. In some cases, the first UE is outside a coverage area of a base station.

The sidelink communications manager 715 may provide a means for transmitting, to the second UE, an indication of the one or more sidelink DRX parameters, where the indication is transmitted over a sidelink communication link with the second UE. In some examples, the sidelink communications manager 715 may provide a means for transmitting a message to the second UE in accordance with the one or more sidelink DRX parameters.

The monitoring component 730 may provide a means for discontinuously monitoring a sidelink communication link for a transmission from the second UE in accordance with the one or more sidelink DRX parameters. In some examples, the monitoring component 730 may provide a means for discontinuously monitoring for a transmission from the base station in accordance with the one or more DRX parameters.

The parameter selection component 720 may provide a means for selecting the one or more sidelink DRX parameters from a set of sidelink DRX parameters for the second UE.

The DRX manager 725 may provide a means for receiving, from a base station, an indication of one or more DRX parameters for communicating with the base station, where the one or more DRX parameters are different from the one or more sidelink DRX parameters. In some examples, the DRX manager 725 may provide a means for powering down a first power amplifier for communicating with the base station in accordance with the one or more DRX parameters.

In some examples, respective configurations of the one or more DRX parameters and the one or more sidelink DRX parameters are based on a first carrier for communicating with the base station and a second carrier for the sidelink communication link, a first frequency range for communicating with the base station and a second frequency range for the sidelink communication link, one or more bands of a primary land mobile network for the sidelink communication link, or a combination thereof.

In some examples, the DRX manager 725 may provide a means for receiving, from a base station, an indication of one or more DRX parameters for communicating with the base station, where the one or more DRX parameters are the same as the one or more sidelink DRX parameters. In some examples, the DRX manager 725 may provide a means for discontinuously monitoring for a transmission from the base station in accordance with the one or more DRX parameters.

Figure 8:
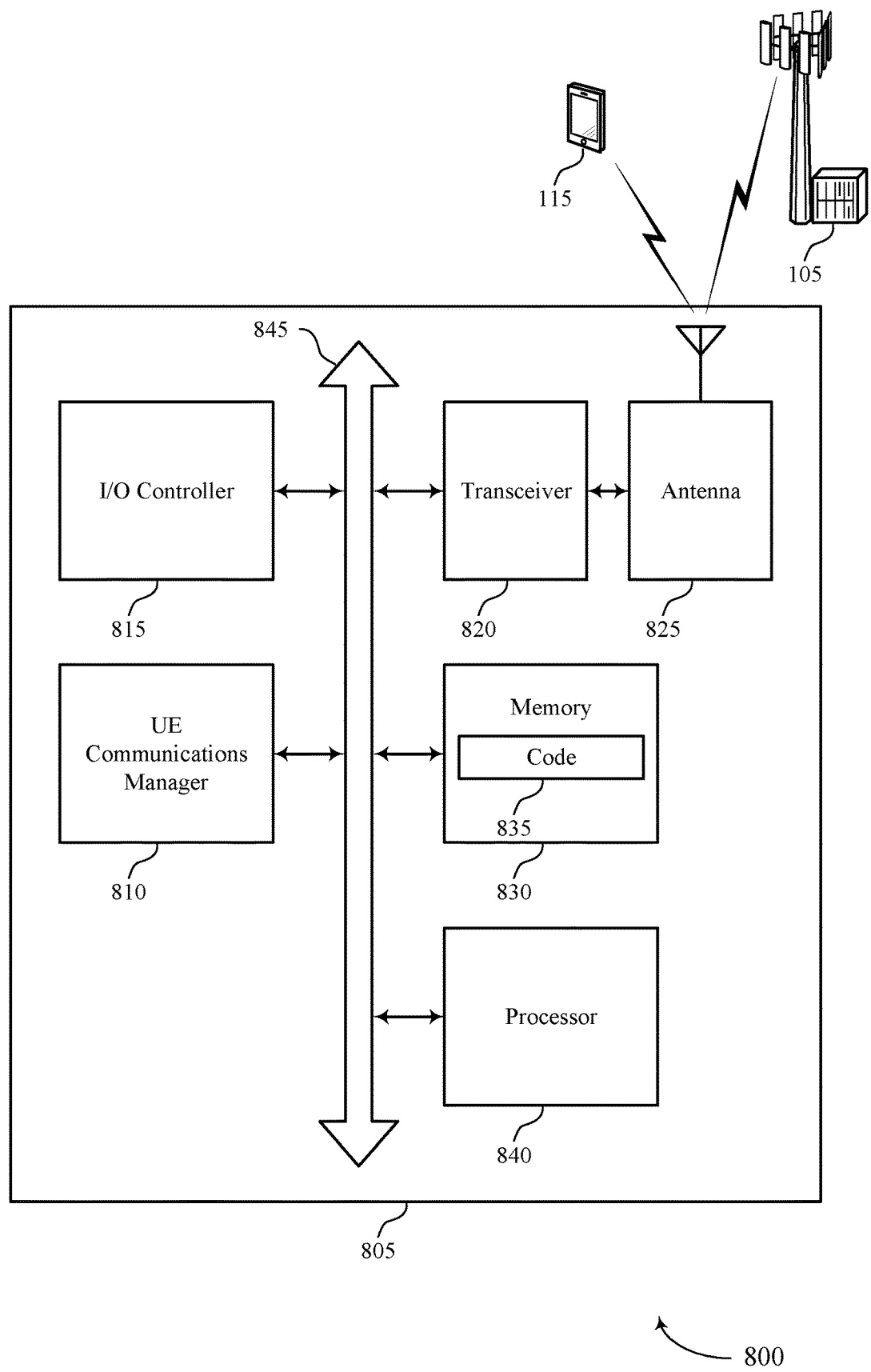
FIG. 8 shows a diagram of a system including a device that supports DRX configurations for sidelink in accordance with one or more aspects of the present disclosure.

FIG. 8 shows a diagram of a system 800 including a device 805 that supports DRX configurations for sidelink in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, an I/O controller 815, a transceiver 820, an antenna 825, memory 830, and a processor 840. These components may be in electronic communication via one or more buses (e.g., bus 845).

The UE communications manager 810 may be configured to support or provide a means for determining one or more sidelink DRX parameters for sidelink communication with a second UE and transmit, to the second UE, an indication of the one or more sidelink DRX parameters, where the indication is transmitted over a sidelink communication link with the second UE. The UE communications manager 810 may also be configured to support or provide a means for determining one or more sidelink DRX parameters for sidelink communication with a second UE and discontinuously monitor a sidelink communication link for a transmission from the second UE in accordance with the one or more sidelink DRX parameters.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting DRX configurations for sidelink).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
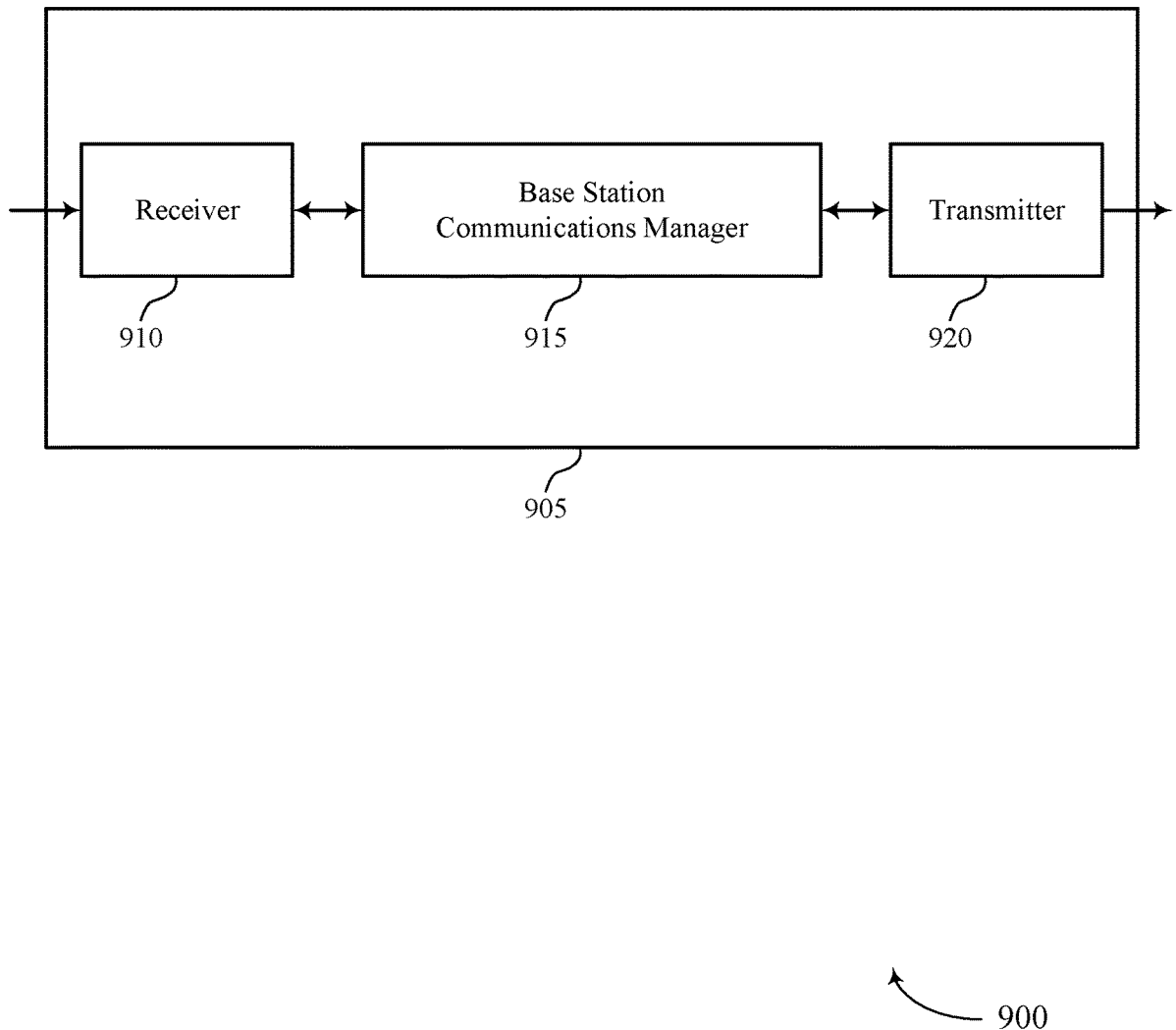
FIGS. 9 and 10 show block diagrams of devices that support DRX configurations for sidelink in accordance with one or more aspects of the present disclosure.

FIG. 9 shows a block diagram 900 of a device 905 that supports DRX configurations for sidelink in accordance with one or more aspects of the present disclosure. The device 905 may be an example of aspects of a base station 105 as described herein. The device 905 may include a receiver 910, a base station communications manager 915, and a transmitter 920. The device 905 may also include a processor. Each of these components may be in communication with one another (e.g., via one or more buses).

The receiver 910 may provide a means for receiving information such as packets, user data, or control information associated with various information channels (e.g., control channels, data channels, and information related to DRX configurations for sidelink, etc.). Information may be passed on to other components of the device 905. The receiver 910 may be an example of aspects of the transceiver 1220 described with reference to FIG. 12. The receiver 910 may utilize a single antenna or a set of antennas.

The base station communications manager 915 may be configured to support or provide a means for configuring one or more sidelink DRX parameters for sidelink communication between a first UE and a second UE over a sidelink communication link and transmitting, to the first UE, a message indicating the one or more sidelink DRX parameters. The base station communications manager 915 may be an example of aspects of the base station communications manager 1210 described herein.

The base station communications manager 915 may be an example of means for performing various aspects of managing DRX configurations for sidelink as described herein. The base station communications manager 915, or its subcomponents, may be implemented in hardware (e.g., in communications management circuitry). The circuitry may comprise of processor, a DSP, an ASIC, an FPGA, or other programmable logic device, discrete gate or transistor logic, discrete hardware components, or any combination thereof designed to perform the functions described in the present disclosure.

In another implementation, the base station communications manager 915, or its sub-components, may be implemented in hardware, code (e.g., communications management software or firmware) executed by a processor, or any combination thereof. If implemented in code executed by a processor, the functions of the base station communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

In some examples, the base station communications manager 915 may be configured to perform various operations (e.g., determining, transmitting) using or otherwise in cooperation with the receiver 910, the transmitter 920, or both.

The base station communications manager 915, or its sub-components, may be physically located at various positions, including being distributed such that portions of functions are implemented at different physical locations by one or more physical components. In some examples, the base station communications manager 915, or its sub-components, may be a separate and distinct component in accordance with various aspects of the present disclosure. In some examples, the base station communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may provide a means for transmitting signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
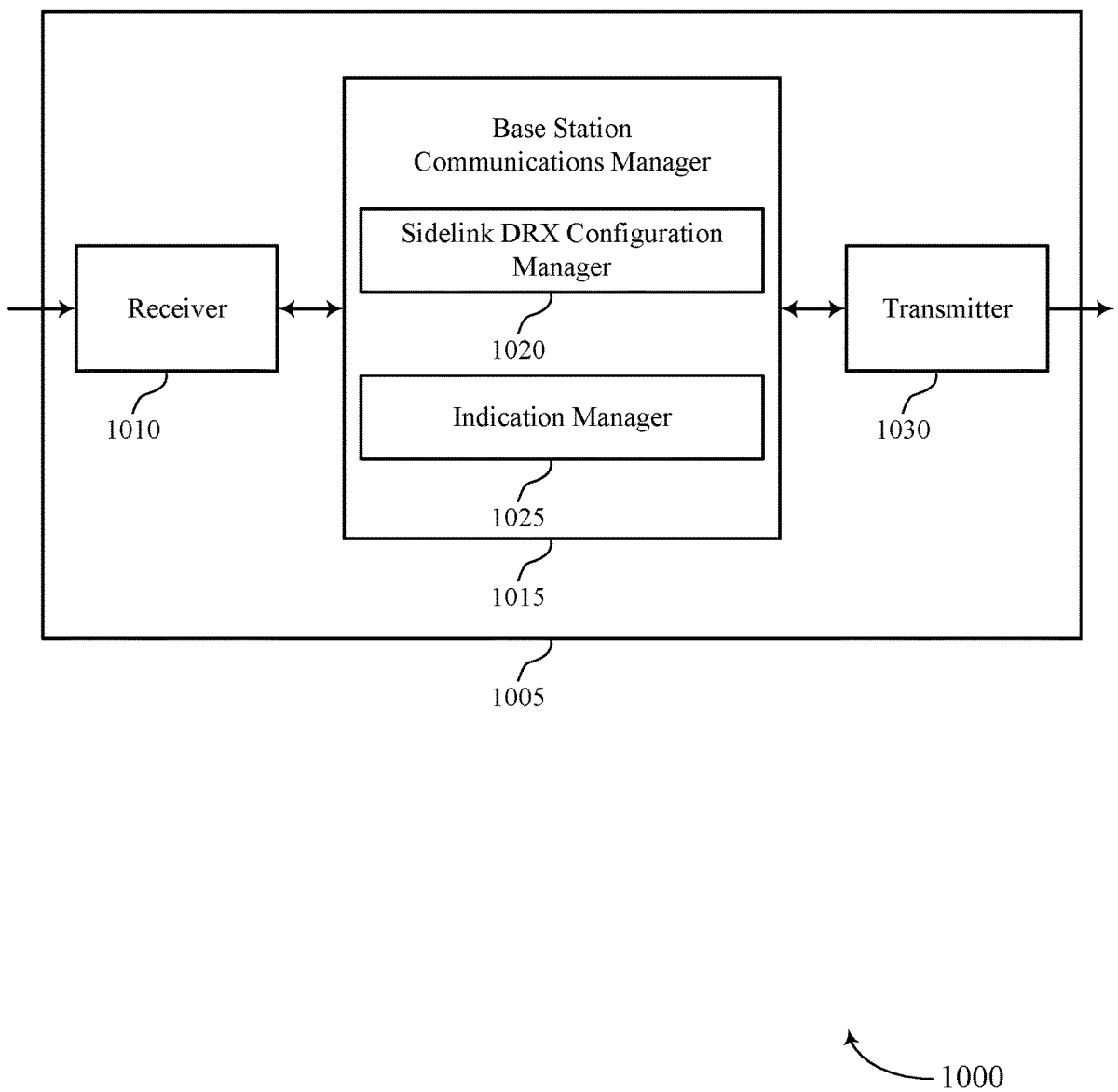

FIG. 10 shows a block diagram 1000 of a device 1005 that supports DRX configurations for sidelink in accordance with one or more aspects of the present disclosure. The device 1005 may be an example of aspects of a device 905, or a base station 105 as described herein. The device 1005 may include a receiver 1010, a base station communications manager 1015, and a transmitter 1030. The device 1005 may also include a processor. Each of these components may be in communication with one another (e.g., via one or more buses).

The receiver 1010 may provide a means for receiving information such as packets, user data, or control information associated with various information channels (e.g., control channels, data channels, and information related to DRX configurations for sidelink, etc.). Information may be passed on to other components of the device 1005. The receiver 1010 may be an example of aspects of the transceiver 1220 described with reference to FIG. 12. The receiver 1010 may utilize a single antenna or a set of antennas.

The base station communications manager 1015 may be an example of aspects of the base station communications manager 915 as described herein. The base station communications manager 1015 may include a sidelink DRX configuration manager 1020 and an indication manager 1025. The base station communications manager 1015 may be an example of aspects of the base station communications manager 1210 described herein.

The sidelink DRX configuration manager 1020 may provide a means for configuring one or more sidelink DRX parameters for sidelink communication between a first UE and a second UE over a sidelink communication link.

The indication manager 1025 may provide a means for transmitting, to the first UE, a message indicating the one or more sidelink DRX parameters.

The transmitter 1030 may provide a means for transmitting signals generated by other components of the device 1005. In some examples, the transmitter 1030 may be collocated with a receiver 1010 in a transceiver module. For example, the transmitter 1030 may be an example of aspects of the transceiver 1220 described with reference to FIG. 12. The transmitter 1030 may utilize a single antenna or a set of antennas.

Figure 11:
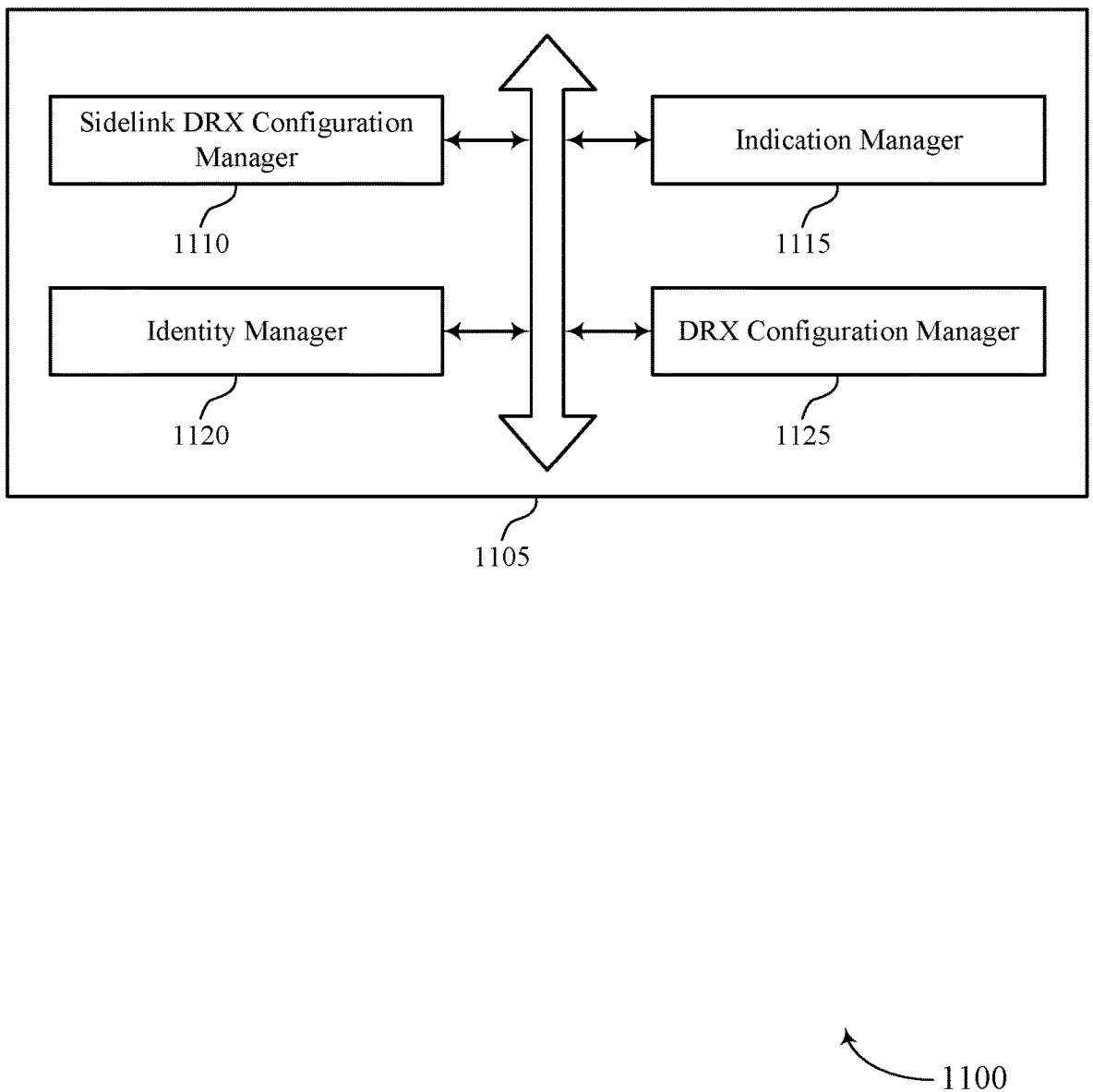
FIG. 11 shows a block diagram of a base station communications manager that supports DRX configurations for sidelink in accordance with one or more aspects of the present disclosure.

FIG. 11 shows a block diagram 1100 of a base station communications manager 1105 that supports DRX configurations for sidelink in accordance with one or more aspects of the present disclosure. The base station communications manager 1105 may be an example of aspects of a base station communications manager 915, a base station communications manager 1015, or a base station communications manager 1210 described herein. The base station communications manager 1105 may include a sidelink DRX configuration manager 1110, an indication manager 1115, an identity manager 1120, and a DRX configuration manager 1125. Each of these modules may communicate, directly or indirectly, with one another (e.g., via one or more buses).

The sidelink DRX configuration manager 1110 may provide a means for configuring one or more sidelink DRX parameters for sidelink communication between a first UE and a second UE over a sidelink communication link. In some cases, the one or more sidelink DRX parameters includes an ON duration, an offset duration, an inactivity timer, one or more cycle durations, a cycle timer, or any combination thereof. In some cases, the first UE is within a coverage area of the base station and the second UE is outside the coverage area of the base station.

The indication manager 1115 may provide a means for transmitting, to the first UE, a message indicating the one or more sidelink DRX parameters. In some examples, the indication manager 1115 may provide a means for transmitting, to the second UE, a second message indicating the one or more sidelink DRX parameters. In some examples, the indication manager 1115 may provide a means for transmitting, to the first UE, an indication of the one or more DRX parameters.

The identity manager 1120 may provide a means for determining an identity of the second UE. In some examples, the identity manager 1120 may transmit, as part of the message, an indication of a destination identity that corresponds to the identity of the second UE, where the one or more sidelink DRX parameters are identified based on the destination identity.

The DRX configuration manager 1125 may provide a means for configuring one or more DRX parameters for communicating with the first UE, where the one or more DRX parameters are different from the one or more sidelink DRX parameters. In some examples, the DRX configuration manager 1125 may provide a means for transmitting, to the first UE, an indication of the one or more DRX parameters.

In some examples, respective configurations of the one or more DRX parameters and the one or more sidelink DRX parameters are based on a first carrier for communicating with the base station and a second carrier for the sidelink communication link, a first frequency range for communicating with the base station and a second frequency range for the sidelink communication link, one or more bands of a primary land mobile network for the sidelink communication link, or a combination thereof.

In some examples, the DRX configuration manager 1125 may provide a means for configuring one or more DRX parameters for communicating with the first UE, where the one or more DRX parameters are the same as the one or more sidelink DRX parameters.

Figure 12:
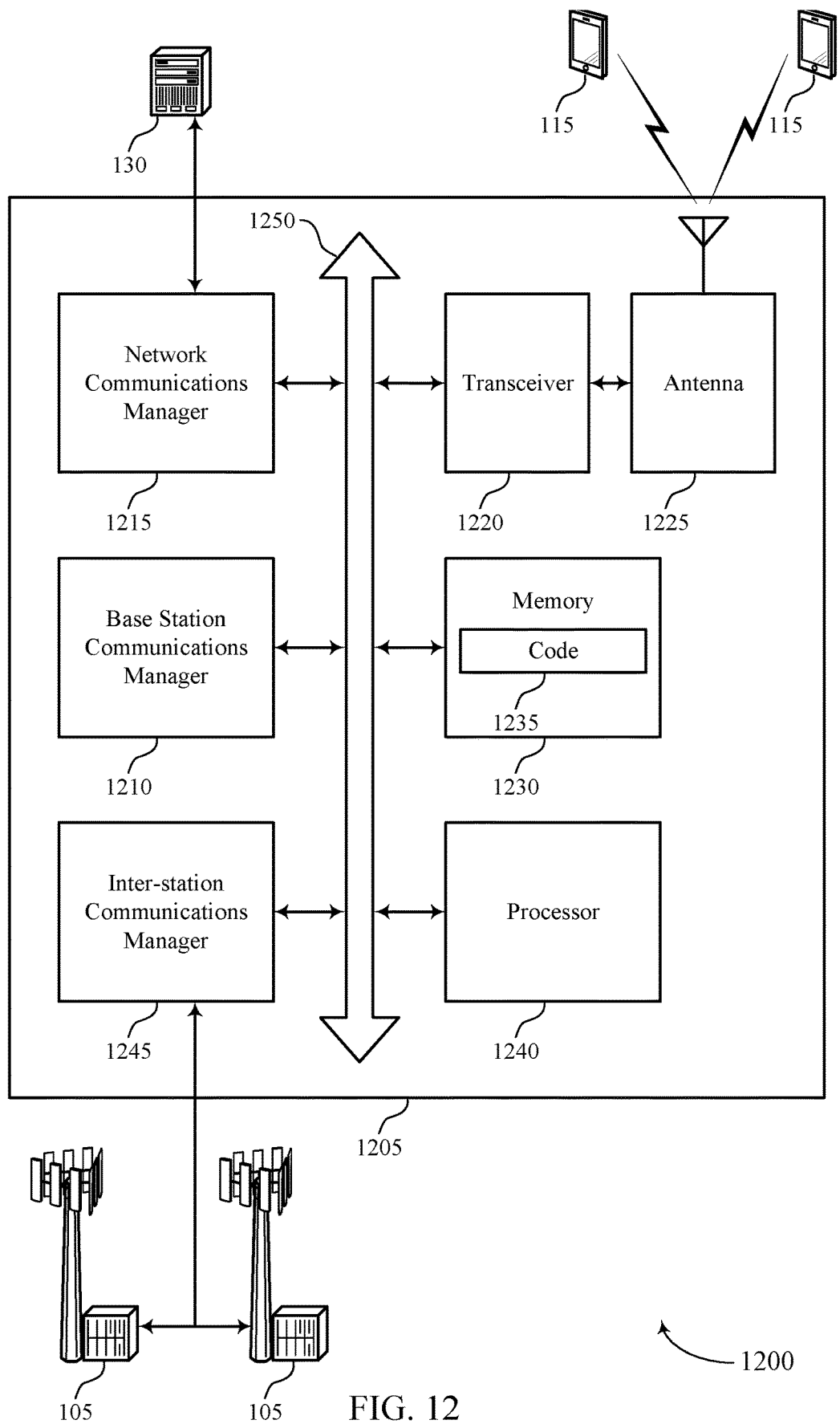
FIG. 12 shows a diagram of a system including a device that supports DRX configurations for sidelink in accordance with one or more aspects of the present disclosure.

FIG. 12 shows a diagram of a system 1200 including a device 1205 that supports DRX configurations for sidelink in accordance with one or more aspects of the present disclosure. The device 1205 may be an example of or include the components of device 905, device 1005, or a base station 105 as described herein. The device 1205 may include components for bi-directional voice and data communications including components for transmitting and receiving communications, including a base station communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The base station communications manager 1210 may be configured to support to provide a means for configuring one or more sidelink DRX parameters for sidelink communication between a first UE and a second UE over a sidelink communication link and transmitting, to the first UE, a message indicating the one or more sidelink DRX parameters.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas. In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting DRX configurations for sidelink).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
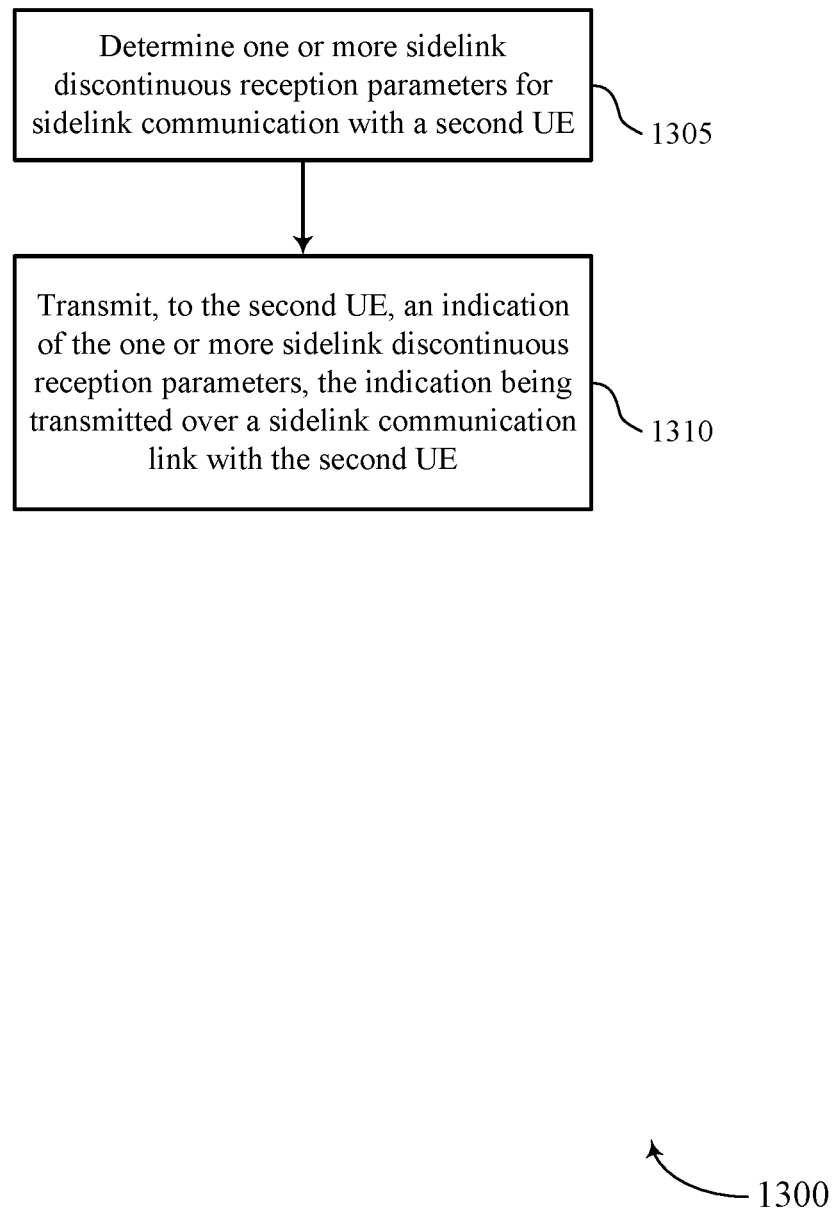
FIGS. 13 through 16 show flowcharts illustrating methods that support DRX configurations for sidelink in accordance with one or more aspects of the present disclosure.

FIG. 13 shows a flowchart illustrating a method 1300 that supports DRX configurations for sidelink in accordance with one or more aspects of the present disclosure. The operations of method 1300 may be implemented by a UE 115 (e.g., a first UE) or its components as described herein. For example, the operations of method 1300 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the first UE may determine one or more sidelink DRX parameters for sidelink communication with a second UE. The operations of 1305 may be performed according to the methods described herein. In some examples, aspects of the operations of 1305 may be performed by a sidelink DRX component as described with reference to FIGS. 5 through 8.

At 1310, the first UE may transmit, to the second UE, an indication of the one or more sidelink DRX parameters, where the indication is transmitted over a sidelink communication link with the second UE. The operations of 1310 may be performed according to the methods described herein. In some examples, aspects of the operations of 1310 may be performed by a sidelink communications manager as described with reference to FIGS. 5 through 8.

Figure 14:
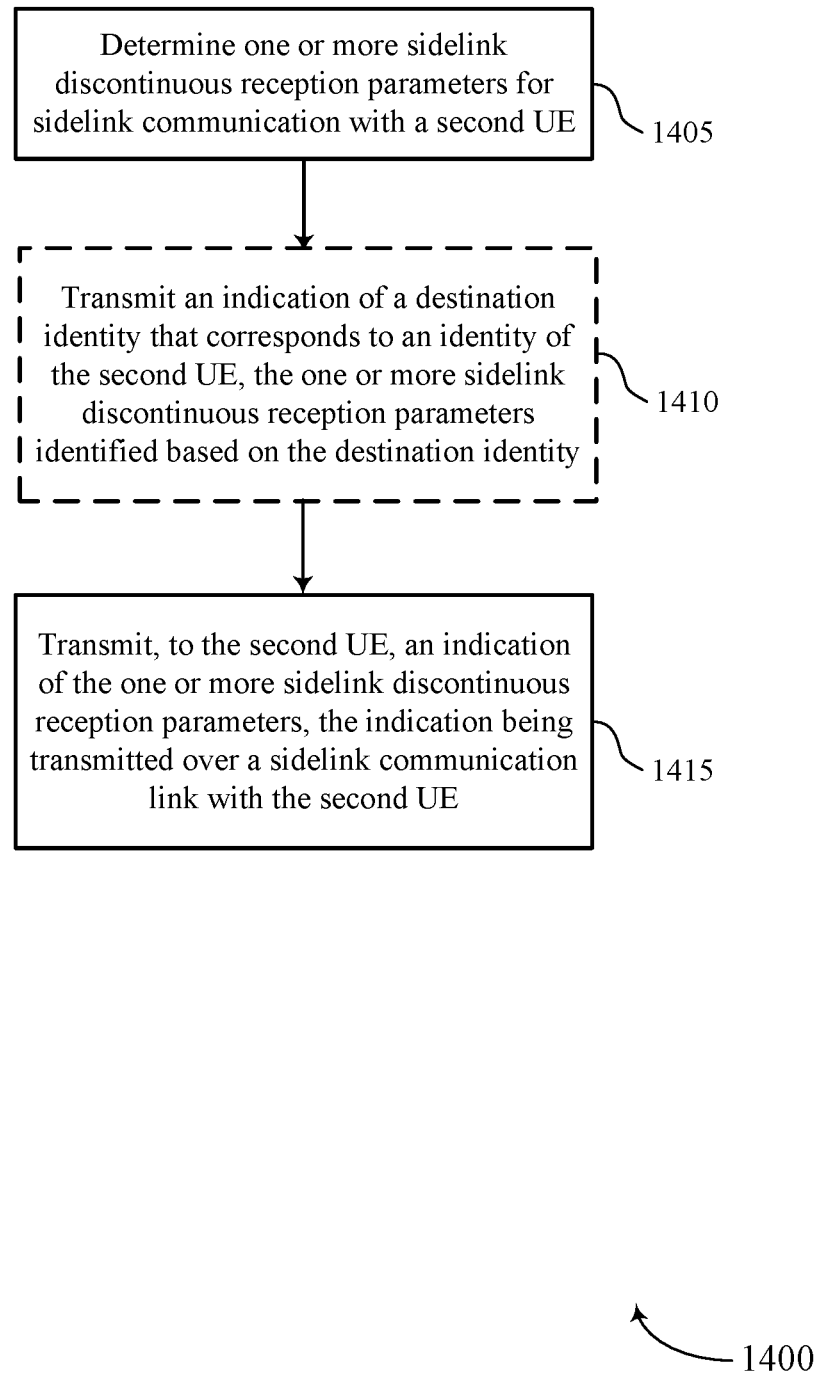

FIG. 14 shows a flowchart illustrating a method 1400 that supports DRX configurations for sidelink in accordance with one or more aspects of the present disclosure. The operations of method 1400 may be implemented by a UE 115 (e.g., a first UE) or its components as described herein. For example, the operations of method 1400 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the first UE may determine one or more sidelink DRX parameters for sidelink communication with a second UE. The operations of 1405 may be performed according to the methods described herein. In some examples, aspects of the operations of 1405 may be performed by a sidelink DRX component as described with reference to FIGS. 5 through 8.

At 1410, the first UE may transmit an indication of a destination identity that corresponds to an identity of the second UE, wherein the one or more sidelink discontinuous reception parameters are identified based at least in part on the destination identity. The operations of 1410 may be performed according to the methods described herein. In some examples, aspects of the operations of 1410 may be performed by a sidelink DRX component as described with reference to FIGS. 5 through 8.

At 1415, the first UE may transmit, to the second UE, an indication of the one or more sidelink DRX parameters, where the indication is transmitted over a sidelink communication link with the second UE. The operations of 1415 may be performed according to the methods described herein. In some examples, aspects of the operations of 1415 may be performed by a sidelink communications manager as described with reference to FIGS. 5 through 8.

Figure 15:
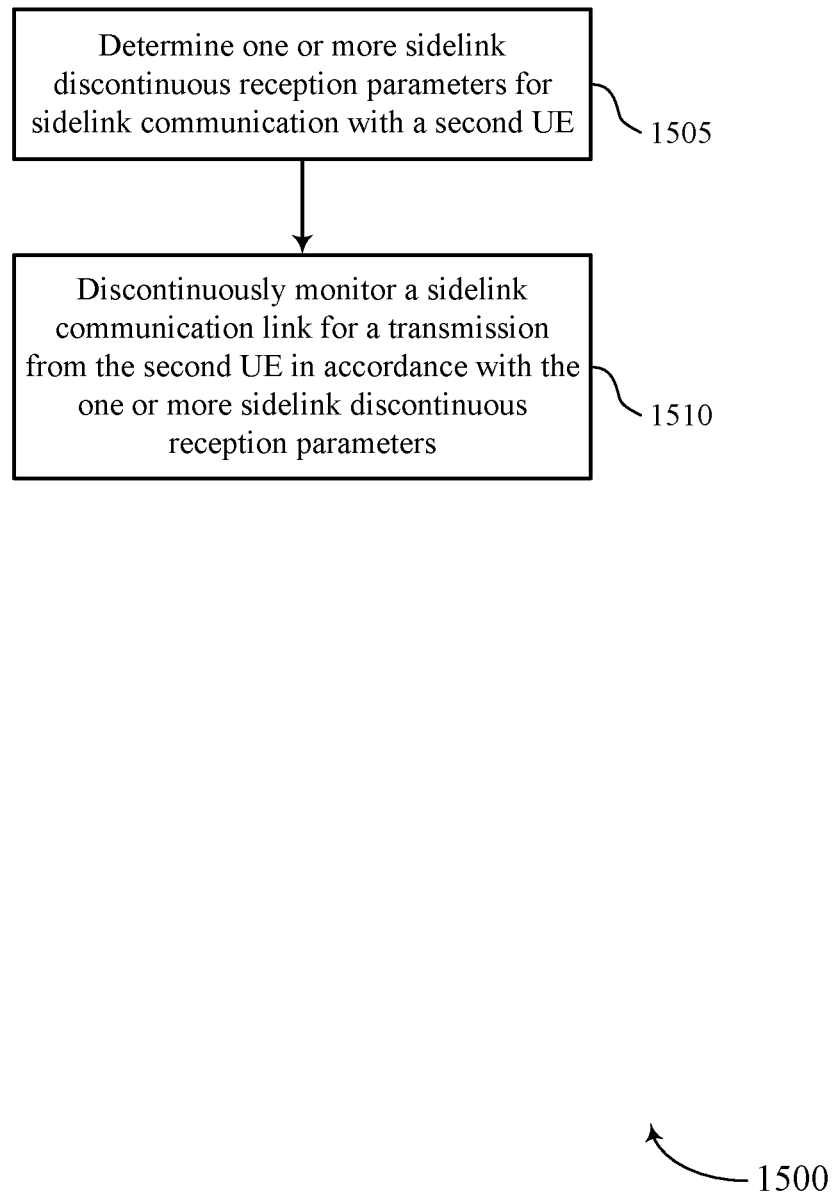

FIG. 15 shows a flowchart illustrating a method 1500 that supports DRX configurations for sidelink in accordance with one or more aspects of the present disclosure. The operations of method 1500 may be implemented by a UE 115 (e.g., a first UE) or its components as described herein. For example, the operations of method 1500 may be performed by a UE communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the first UE may determine one or more sidelink DRX parameters for sidelink communication with a second UE. The operations of 1505 may be performed according to the methods described herein. In some examples, aspects of the operations of 1505 may be performed by a sidelink DRX component as described with reference to FIGS. 5 through 8.

At 1510, the first UE may discontinuously monitor a sidelink communication link for a transmission from the second UE in accordance with the one or more sidelink DRX parameters. The operations of 1510 may be performed according to the methods described herein. In some examples, aspects of the operations of 1510 may be performed by a monitoring component as described with reference to FIGS. 5 through 8.

Figure 16:
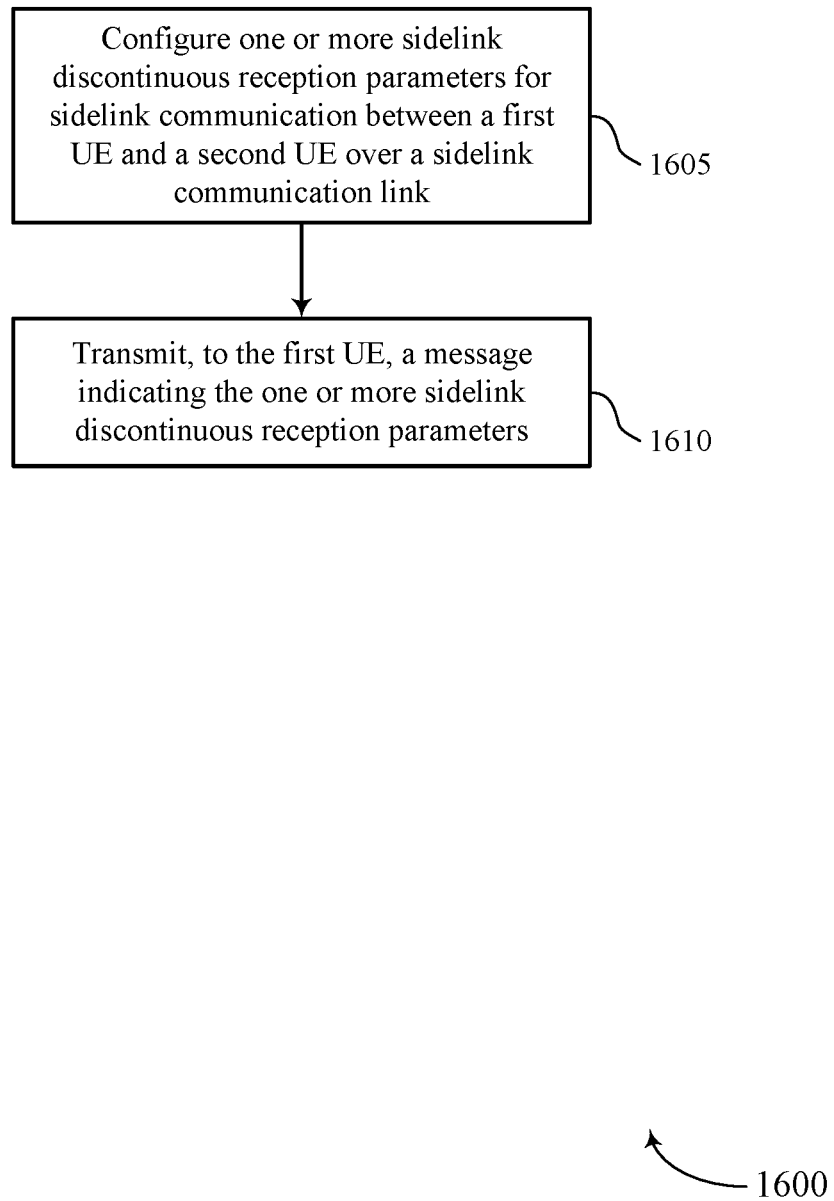

FIG. 16 shows a flowchart illustrating a method 1600 that supports DRX configurations for sidelink in accordance with one or more aspects of the present disclosure. The operations of method 1600 may be implemented by a base station 105 or its components as described herein. For example, the operations of method 1600 may be performed by a base station communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may configure one or more sidelink DRX parameters for sidelink communication between a first UE and a second UE over a sidelink communication link. The operations of 1605 may be performed according to the methods described herein. In some examples, aspects of the operations of 1605 may be performed by a sidelink DRX configuration manager as described with reference to FIGS. 9 through 12.

At 1610, the base station may transmit, to the first UE, a message indicating the one or more sidelink DRX parameters. The operations of 1610 may be performed according to the methods described herein. In some examples, aspects of the operations of 1610 may be performed by an indication manager as described with reference to FIGS. 9 through 12.

The following provides an overview of examples of the present disclosure.

Example 1: A method for wireless communication at a first UE, comprising: determining one or more sidelink discontinuous reception parameters for sidelink communication with a second UE; and transmitting, to the second UE, an indication of the one or more sidelink discontinuous reception parameters, wherein the indication is transmitted over a sidelink communication link with the second UE.

Example 2: The method of example 1, wherein determining the one or more sidelink discontinuous reception parameters comprises: receiving, from a base station, a message indicating the one or more sidelink discontinuous reception parameters for the second UE.

Example 3: The method of any of examples 1 through 2 wherein determining the one or more sidelink discontinuous reception parameters comprises: selecting the one or more sidelink discontinuous reception parameters from a set of sidelink discontinuous reception parameters for the second UE.

Example 4: The method of any of examples 1 through 3, wherein transmitting the indication of the one or more sidelink discontinuous reception parameters comprises: transmitting an indication of a destination identity that corresponds to an identity of the second UE, wherein the one or more sidelink discontinuous reception parameters are identified based at least in part on the destination identity.

Example 5: The method of any of examples 1 through 4, wherein transmitting the indication of the one or more sidelink discontinuous reception parameters comprises: transmitting the indication to the second UE via sidelink control information, or a MAC control element, or a combination thereof.

Example 6: The method of example 6, further comprising: transmitting the downlink control information to the second UE on a physical sidelink control channel.

Example 7: The method of any of examples 1 through 6, further comprising: transmitting a message to the second UE in accordance with the one or more sidelink discontinuous reception parameters.

Example 8: The method of any of examples 1 through 7, further comprising: receiving, from a base station, an indication of one or more discontinuous reception parameters for communicating with the base station, wherein the one or more discontinuous reception parameters are different from the one or more sidelink discontinuous reception parameters; and discontinuously monitoring for a transmission from the base station in accordance with the one or more discontinuous reception parameters.

Example 9: The method of example 8, wherein discontinuously monitoring for the transmission from the base station comprises: powering down a first power amplifier for communicating with the base station in accordance with the one or more discontinuous reception parameters, the method further comprising: powering down a second power amplifier for the sidelink communication link in accordance with the one or more sidelink discontinuous reception parameters.

Example 10: The method of any of examples 8 through 9, wherein respective configurations of the one or more discontinuous reception parameters and the one or more sidelink discontinuous reception parameters are based at least in part on a first carrier for communicating with the base station and a second carrier for the sidelink communication link, a first frequency range for communicating with the base station and a second frequency range for the sidelink communication link, one or more bands of a primary land mobile network for the sidelink communication link, or a combination thereof.

Example 11: The method of any of examples 1 through 10, further comprising: receiving, from a base station, an indication of one or more discontinuous reception parameters for communicating with the base station, wherein the one or more discontinuous reception parameters are the same as the one or more sidelink discontinuous reception parameters; and discontinuously monitoring for a transmission from the base station in accordance with the one or more discontinuous reception parameters.

Example 12: The method of any of examples 1 through 11, wherein the one or more sidelink discontinuous reception parameters comprises an ON duration, an offset duration, an inactivity timer, one or more cycle durations, a cycle timer, or any combination thereof.

Example 13: The method of any of examples 1 through 12, wherein the first UE is within a coverage area of a base station.

Example 14: The method of any of examples 1 through 13, wherein the first UE and the second UE are outside a coverage area of a base station.

Example 15: A method for wireless communication at a first UE, comprising: determining one or more sidelink discontinuous reception parameters for sidelink communication with a second UE; and discontinuously monitoring a sidelink communication link for a transmission from the second UE in accordance with the one or more sidelink discontinuous reception parameters.

Example 16: The method of example 15, further comprising: receiving, from the second UE, an indication of the one or more sidelink discontinuous reception parameters, the indication received over the sidelink communication link, wherein the one or more sidelink discontinuous reception parameters are determined based at least in part on the received indication.

Example 17: The method of example 16, further comprising: receiving the indication of the one or more sidelink discontinuous reception parameters from the second UE via sidelink control information, or a MAC control element, or a combination thereof.

Example 18: The method of example 16, further comprising: receiving the downlink control information from the second UE on a physical sidelink control channel.

Example 19: The method of any of examples 15 through 18, further comprising: receiving, from a base station, a message indicating the one or more sidelink discontinuous reception parameters for the second UE, wherein the one or more sidelink discontinuous reception parameters are determined based at least in part on the received indication.

Example 20: The method of any of examples 15 through 19, further comprising: identifying the one or more sidelink discontinuous reception parameters based at least in part on a destination identity corresponding to an identity of the first UE, wherein discontinuously monitoring the sidelink communication link is based at least in part on identifying the one or more sidelink discontinuous reception parameters.

Example 21: The method of any of examples 15 through 20, wherein the one or more sidelink discontinuous reception parameters comprises an ON duration, an offset duration, an inactivity timer, one or more cycle durations, a cycle timer, or any combination thereof.

Example 22: The method of any of examples 15 through 21, wherein the first UE is outside a coverage area of a base station.

Example 23: A method for wireless communication at a base station comprising: configuring one or more sidelink discontinuous reception parameters for sidelink communication between a first user equipment (UE) and a second UE over a sidelink communication link; and transmitting, to the first UE, a message indicating the one or more sidelink discontinuous reception parameters.

Example 24: The method of example 23, wherein transmitting the message indicating the one or more sidelink discontinuous reception parameters comprises: determining an identity of the second UE; and transmitting, as part of the message, an indication of a destination identity that corresponds to the identity of the second UE, wherein the one or more sidelink discontinuous reception parameters are identified based at least in part on the destination identity.

Example 25: The method of any of examples 23 through 24, further comprising: transmitting, to the second UE, a second message indicating the one or more sidelink discontinuous reception parameters.

Example 26: The method of any of examples 23 through 25, further comprising: configuring one or more discontinuous reception parameters for communicating with the first UE, wherein the one or more discontinuous reception parameters are different from the one or more sidelink discontinuous reception parameters; and transmitting, to the first UE, an indication of the one or more discontinuous reception parameters.

Example 27: The method of example 26, wherein: respective configurations of the one or more discontinuous reception parameters and the one or more sidelink discontinuous reception parameters are based at least in part on a first carrier for communicating with the base station and a second carrier for the sidelink communication link, a first frequency range for communicating with the base station and a second frequency range for the sidelink communication link, one or more bands of a primary land mobile network for the sidelink communication link, or a combination thereof.

Example 28: The method of any of examples 23 through 27, further comprising: configuring one or more discontinuous reception parameters for communicating with the first UE, wherein the one or more discontinuous reception parameters are the same as the one or more sidelink discontinuous reception parameters; and transmitting, to the first UE, an indication of the one or more discontinuous reception parameters.

Example 29: The method of any of examples 23 through 28, wherein the one or more sidelink discontinuous reception parameters comprises an ON duration, an offset duration, an inactivity timer, one or more cycle durations, a cycle timer, or any combination thereof.

Example 30: The method of any of examples 23 through 29, wherein the first UE is within a coverage area of the base station and the second UE is outside the coverage area of the base station.

Example 31: An apparatus for wireless communication comprising at least one means for performing a method of any one of the examples 1 through 14.

Example 32: An apparatus for wireless communication comprising at least one means for performing a method of any one of the examples 15 through 22.

Example 33: An apparatus for wireless communication comprising at least one means for performing a method of any one of the examples 23 through 30.

Example 34: An apparatus for wireless communication comprising a processor and memory coupled to the processor, the processor and memory configured to perform a method of any one of examples 1 through 14.

Example 35: An apparatus for wireless communication comprising a processor and memory coupled to the processor, the processor and memory configured to perform a method of any one of examples 15 through 22.

Example 36: An apparatus for wireless communication comprising a processor and memory coupled to the processor, the processor and memory configured to perform a method of any one of examples 23 through 30.

Example 37: A non-transitory computer-readable medium storing code for wireless communication, the code comprising instructions executable by a processor to perform a method of any one of examples 1 through 14.

Example 38: A non-transitory computer-readable medium storing code for wireless communication, the code comprising instructions executable by a processor to perform a method of any one of examples 15 through 22.

Example 39: A non-transitory computer-readable medium storing code for wireless communication, the code comprising instructions executable by a processor to perform a method of any one of examples 23 through 30.

It should be noted that the methods described herein describe possible implementations, and that the operations and the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations described herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a first user equipment (UE), comprising:
    selecting one or more sidelink discontinuous reception parameters for sidelink communication with a second UE, the one or more sidelink discontinuous reception parameters being selected from a set of sidelink discontinuous reception parameters for the second UE; and
    transmitting, to the second UE, an indication of the one or more sidelink discontinuous reception parameters, wherein the indication comprises a destination identity that corresponds to an identity of the second UE and is transmitted over a sidelink communication link with the second UE.

2. The method of claim 1, wherein determining the one or more sidelink discontinuous reception parameters comprises:
    receiving, from a network device, a message indicating the one or more sidelink discontinuous reception parameters for the second UE.

3. The method of claim 1,
    wherein the one or more sidelink discontinuous reception parameters are identified based at least in part on the destination identity.

4. The method of claim 1, wherein transmitting the indication of the one or more sidelink discontinuous reception parameters comprises:
    transmitting the indication to the second UE via sidelink control information, or a medium access control (MAC) control element, or a combination thereof.

5. The method of claim 1, further comprising:
    transmitting downlink control information to the second UE on a physical sidelink control channel.

6. The method of claim 1, further comprising:
    transmitting a message to the second UE in accordance with the one or more sidelink discontinuous reception parameters.

7. The method of claim 1, further comprising:
    receiving, from a network device, an indication of one or more discontinuous reception parameters for communicating with the network device, wherein the one or more discontinuous reception parameters are different from the one or more sidelink discontinuous reception parameters; and
    discontinuously monitoring for a transmission from the network device in accordance with the one or more discontinuous reception parameters.

8. The method of claim 7, wherein discontinuously monitoring for the transmission from the network device comprises:
    powering down a first power amplifier for communicating with the network device in accordance with the one or more discontinuous reception parameters, the method further comprising:
        powering down a second power amplifier for the sidelink communication link in accordance with the one or more sidelink discontinuous reception parameters.

9. The method of claim 7, wherein:
    respective configurations of the one or more discontinuous reception parameters and the one or more sidelink discontinuous reception parameters are based at least in part on a first carrier for communicating with the network device and a second carrier for the sidelink communication link, a first frequency range for communicating with the network device and a second frequency range for the sidelink communication link, one or more bands of a primary land mobile network for the sidelink communication link, or a combination thereof.

10. The method of claim 1, further comprising:
receiving, from a network device, an indication of one or more discontinuous reception parameters for communicating with the network device, wherein the one or more discontinuous reception parameters are the same as the one or more sidelink discontinuous reception parameters; and
discontinuously monitoring for a transmission from the network device in accordance with the one or more discontinuous reception parameters.

11. The method of claim 1, wherein the one or more sidelink discontinuous reception parameters comprises an ON duration, an offset duration, an inactivity timer, one or more cycle durations, a cycle timer, or any combination thereof.

12. The method of claim 1, wherein the first UE is within a coverage area of a network device.

13. The method of claim 1, wherein the first UE and the second UE are outside a coverage area of a network device.

14. A method for wireless communication at a first user equipment (UE), comprising:
determining one or more sidelink discontinuous reception parameters for sidelink communication with a second UE;
receiving, from the second UE, an indication of the one or more sidelink discontinuous reception parameters selected by the second UE from a set of sidelink discontinuous parameters, wherein the indication comprises a destination identity that corresponds to an identity of the first UE; and
discontinuously monitoring a sidelink communication link for a transmission from the second UE in accordance with the one or more sidelink discontinuous reception parameters.

15. The method of claim 14, further comprising:
receiving the indication over the sidelink communication link, wherein the one or more sidelink discontinuous reception parameters are determined based at least in part on the received indication.

16. The method of claim 15, further comprising:
receiving the indication of the one or more sidelink discontinuous reception parameters from the second UE via sidelink control information, or a medium access control (MAC) control element, or a combination thereof.

17. The method of claim 14, further comprising:
receiving downlink control information from the second UE on a physical sidelink control channel.

18. The method of claim 14, further comprising:
receiving, from a network device, a message indicating the one or more sidelink discontinuous reception parameters for the second UE, wherein the one or more sidelink discontinuous reception parameters are determined based at least in part on the received indication.

19. The method of claim 14, further comprising:
identifying the one or more sidelink discontinuous reception parameters based at least in part on the destination identity corresponding to an identity of the first UE, wherein discontinuously monitoring the sidelink communication link is based at least in part on identifying the one or more sidelink discontinuous reception parameters.

20. The method of claim 14, wherein the one or more sidelink discontinuous reception parameters comprises an ON duration, an offset duration, an inactivity timer, one or more cycle durations, a cycle timer, or any combination thereof.

21. The method of claim 14, wherein the first UE is outside a coverage area of a network device.

22. A method for wireless communication at a network device comprising:
configuring one or more sidelink discontinuous reception parameters for sidelink communication between a first user equipment (UE) and a second UE over a sidelink communication link; and
transmitting, to the first UE, a message indicating the one or more sidelink discontinuous reception parameters and an indication of a destination identity that corresponds to an identity of the second UE, the one or more sidelink discontinuous reception parameters being part of a set of sidelink discontinuous parameters that the first UE is to select from for the second UE.

23. The method of claim 22,
wherein the one or more sidelink discontinuous reception parameters are identified based at least in part on the destination identity.

24. The method of claim 22, further comprising:
transmitting, to the second UE, a second message indicating the one or more sidelink discontinuous reception parameters.

25. The method of claim 22, further comprising:
configuring one or more discontinuous reception parameters for communicating with the first UE, wherein the one or more discontinuous reception parameters are different from the one or more sidelink discontinuous reception parameters; and
transmitting, to the first UE, an indication of the one or more discontinuous reception parameters.

26. The method of claim 25, wherein:
respective configurations of the one or more discontinuous reception parameters and the one or more sidelink discontinuous reception parameters are based at least in part on a first carrier for communicating with the network device and a second carrier for the sidelink communication link, a first frequency range for communicating with the network device and a second frequency range for the sidelink communication link, one or more bands of a primary land mobile network for the sidelink communication link, or a combination thereof.

27. The method of claim 22, further comprising:
configuring one or more discontinuous reception parameters for communicating with the first UE, wherein the one or more discontinuous reception parameters are the same as the one or more sidelink discontinuous reception parameters; and
transmitting, to the first UE, an indication of the one or more discontinuous reception parameters.

28. The method of claim 22, wherein the one or more sidelink discontinuous reception parameters comprises an ON duration, an offset duration, an inactivity timer, one or more cycle durations, a cycle timer, or any combination thereof.

29. An apparatus for wireless communication at a first user equipment (UE), comprising:
a processor; and
memory coupled to the processor, the memory comprising instructions executable by the processor to cause the apparatus to:

determine one or more sidelink discontinuous reception parameters for sidelink communication with a second UE;
select the one or more sidelink discontinuous reception parameters from a set of sidelink discontinuous reception parameters for the second UE; and
transmit, to the second UE, an indication of the one or more sidelink discontinuous reception parameters, wherein the indication comprises a destination identity that corresponds to an identity of the second UE and is transmitted over a sidelink communication link with the second UE.

* * * * *